(12) United States Patent
Mendelson

(10) Patent No.: US 9,420,423 B1
(45) Date of Patent: Aug. 16, 2016

(54) RF BEACON DEPLOYMENT AND METHOD OF USE

(71) Applicant: Ehud Mendelson, Coral Springs, FL (US)

(72) Inventor: Ehud Mendelson, Coral Springs, FL (US)

( * ) Notice: Subject to any disclaimer, the term of this patent is extended or adjusted under 35 U.S.C. 154(b) by 0 days.

(21) Appl. No.: 15/086,028

(22) Filed: Mar. 30, 2016

Related U.S. Application Data

(62) Division of application No. 14/285,439, filed on May 22, 2014, now abandoned, which is a division of application No. 14/285,406, filed on May 22, 2014, which is a division of application No. 14/285,332, filed on May 22, 2014, which is a division of application No. 14/285,273, filed on May 22, 2014, now Pat. No. 9,204,257, which is a division of application No. 14/285,209, filed on May 22, 2014, now Pat. No. 9,204,251, which is a division of application No. 12/930,735, filed on Jan. 14, 2011, now Pat. No. 9,020,687, which is a division of application No. 11/396,843, filed on Apr. 3, 2006, now Pat. No. 7,899,583, application No. 14/285,209, which (Continued)

(51) Int. Cl.
| | |
|---|---|
| *H04B 7/00* | (2006.01) |
| *H04W 4/02* | (2009.01) |
| *H04W 40/24* | (2009.01) |
| *H04W 4/00* | (2009.01) |

(52) U.S. Cl.
CPC .............. *H04W 4/021* (2013.01); *H04W 4/008* (2013.01); *H04W 40/244* (2013.01)

(58) Field of Classification Search
CPC .... H04W 4/021; H04W 40/244; H04W 4/008
USPC ............................................... 455/41.2, 41.3
See application file for complete search history.

(56) References Cited

U.S. PATENT DOCUMENTS

| | | | |
|---|---|---|---|
| 3,114,128 | A | 12/1963 | Ljungman |
| 3,130,298 | A | 4/1964 | Schwarz |
| 3,158,836 | A | 11/1964 | McCauley |
| 3,166,732 | A | 1/1965 | Ljungman |
| 3,867,615 | A | 2/1975 | Sioufi |
| 4,491,970 | A | 1/1985 | LaWhite et al. |
| 5,195,126 | A | 3/1993 | Carrier et al. |
| 5,272,483 | A | 12/1993 | Kato |
| 5,293,163 | A | 3/1994 | Kakihara |
| 5,305,370 | A | 4/1994 | Kearns et al. |
| 5,319,363 | A | 6/1994 | Welch et al. |
| 5,383,127 | A | 1/1995 | Shibata |
| 5,416,712 | A | 5/1995 | Geier |
| 5,432,508 | A | 7/1995 | Jackson |
| 5,442,348 | A | 8/1995 | Mushell |
| 5,454,461 | A | 10/1995 | Jacobs |
| 5,485,520 | A | 1/1996 | Chaum et al. |
| 5,504,482 | A | 4/1996 | Schreder |
| 5,568,535 | A | 10/1996 | Sheffer et al. |

(Continued)

FOREIGN PATENT DOCUMENTS

JP          9126804 A          5/1997

*Primary Examiner* — April G Gonzales
(74) *Attorney, Agent, or Firm* — Allen D. Hertz, P.A.; Allen D. Hertz

(57) ABSTRACT

A precise navigation system utilizing a fleet of deployed RF beacons and an associated application. The RF beacons are installed in known locations about a predefined facility area. The RF beacons emit either a Bluetooth or Wi-Fi beacon signal. An RF beacon identifier is encoded into the beacon signal. The location of the beacon is determined by using the beacon identifier in conjunction with a beacon location index. The location can be used to determine a location of the receiving mobile device, initiating conveyance of information associated with merchants in the proximate area, assistance for parking, etc. The system can be employed to assist in emergency conditions, obtaining road sign information, and other applications where RF beacons can transmit specific location based services and information.

18 Claims, 12 Drawing Sheets

Related U.S. Application Data is a division of application No. 13/135,421, filed on Jul. 5, 2011, now Pat. No. 9,374,673, which is a division of application No. 12/932,811, filed on Mar. 7, 2011, now Pat. No. 8,941,485, which is a division of application No. 12/069,899, filed on Feb. 13, 2008, now Pat. No. 7,924,149, which is a division of application No. 11/472,706, filed on Jun. 22, 2006, now Pat. No. 8,896,485, which is a division of application No. 11/429,864, filed on May 8, 2006, now Pat. No. 8,836,580, application No. 14/285,209, which is a division of application No. 12/587,042, filed on Oct. 1, 2009, now Pat. No. 8,866,673.

(60) Provisional application No. 60/670,097, filed on Apr. 12, 2005, provisional application No. 60/678,947, filed on May 9, 2005.

(56) References Cited

U.S. PATENT DOCUMENTS

| | | | |
|---|---|---|---|
| 5,606,506 | A | 2/1997 | Kyrtsos |
| 5,638,279 | A | 6/1997 | Kishi et al. |
| 5,652,570 | A | 7/1997 | Lepkofker |
| 5,712,619 | A | 1/1998 | Simkin et al. |
| 5,742,233 | A | 4/1998 | Hoffman et al. |
| 5,771,001 | A | 6/1998 | Cobb |
| 5,798,733 | A | 8/1998 | Ethridge |
| 5,838,237 | A | 11/1998 | Revell et al. |
| 5,873,040 | A | 2/1999 | Dunn et al. |
| 5,910,782 | A | 6/1999 | Schmitt et al. |
| 5,929,777 | A | 7/1999 | Reynolds |
| 5,940,481 | A | 8/1999 | Zeitman |
| 5,971,921 | A | 10/1999 | Timbel |
| 5,995,040 | A | 11/1999 | Issler et al. |
| 6,028,537 | A | 2/2000 | Suman et al. |
| 6,072,396 | A | 6/2000 | Gaukel |
| 6,340,928 | B1 | 1/2002 | McCurdy |
| 6,445,937 | B1 * | 9/2002 | daSilva ............. H04W 52/0229 455/574 |
| 6,535,127 | B1 | 3/2003 | Taylor |
| 6,636,732 | B1 | 10/2003 | Boling et al. |
| 6,738,628 | B1 | 5/2004 | McCall et al. |
| 6,807,564 | B1 | 10/2004 | Zellner et al. |
| 6,970,101 | B1 | 11/2005 | Squire et al. |
| 7,026,954 | B2 | 4/2006 | Slemmer et al. |
| 7,031,875 | B2 | 4/2006 | Ellenby et al. |
| 7,034,678 | B2 | 4/2006 | Burkley et al. |
| 7,072,666 | B1 * | 7/2006 | Kullman ............... H04W 64/00 455/404.2 |
| 7,245,216 | B2 | 7/2007 | Burkley et al. |
| 7,483,917 | B2 | 1/2009 | Sullivan et al. |
| 7,743,337 | B1 | 6/2010 | Maeda et al. |
| 7,907,931 | B2 | 3/2011 | Hartigan et al. |
| 7,933,395 | B1 | 4/2011 | Bailly et al. |
| 8,041,330 | B1 | 10/2011 | Garin |
| 8,126,960 | B2 | 2/2012 | Obradovich et al. |
| 8,770,477 | B2 | 7/2014 | Hefetz |
| 8,896,485 | B2 | 11/2014 | Mendelson |
| 2001/0026223 | A1 | 10/2001 | Menard et al. |
| 2002/0129138 | A1 | 9/2002 | Carter |
| 2002/0131386 | A1 | 9/2002 | Gwon |
| 2003/0034881 | A1 | 2/2003 | Linnett et al. |
| 2003/0045280 | A1 | 3/2003 | Simons |
| 2003/0050039 | A1 | 3/2003 | Baba et al. |
| 2003/0087628 | A1 | 5/2003 | Michibata |
| 2003/0148771 | A1 * | 8/2003 | de Verteuil ........... H04W 64/00 455/456.1 |
| 2004/0066917 | A1 | 4/2004 | Yasukawa et al. |
| 2004/0072583 | A1 | 4/2004 | Weng |
| 2004/0239498 | A1 | 12/2004 | Miller |
| 2005/0021369 | A1 | 1/2005 | Cohen et al. |
| 2005/0070315 | A1 | 3/2005 | Rai et al. |
| 2005/0111630 | A1 | 5/2005 | Potorny et al. |
| 2006/0033641 | A1 | 2/2006 | Jaupitre et al. |
| 2006/0095331 | A1 | 5/2006 | O'Malley et al. |
| 2006/0122767 | A1 | 6/2006 | Athalye |
| 2006/0163349 | A1 | 7/2006 | Neugebauer |
| 2006/0253226 | A1 | 11/2006 | Mendelson |
| 2007/0032225 | A1 | 2/2007 | Konicek et al. |
| 2008/0227473 | A1 | 9/2008 | Haney |
| 2008/0280624 | A1 | 11/2008 | Wrappe |
| 2009/0006418 | A1 | 1/2009 | O'Malley |
| 2012/0188101 | A1 | 7/2012 | Ganot |
| 2013/0113936 | A1 | 5/2013 | Cohen et al. |

* cited by examiner

RF BEACON DEPLOYMENT AND METHOD OF USE

RELATED APPLICATIONS

This application is:

A) a Divisional Application of U.S. patent application Ser. No. 14/285,439 filed on May 22, 2014, which is a Divisional Application of U.S. patent application Ser. No. 14/285,406 filed on May 22, 2014, which is a Divisional Application of U.S. patent application Ser. No. 14/285,332 filed on May 22, 2014, which is a Divisional Application of U.S. patent application Ser. No. 14/285,273 filed on May 22, 2014, (now U.S. Pat. No. 9,204,257 on Dec. 1, 2015), which is a Divisional Application of U.S. patent application Ser. No. 14/285,209 filed on May 22, 2014, (now U.S. Pat. No. 9,204,251 on Dec. 1, 2015), which is a Divisional Application of U.S. patent application Ser. No. 12/930,735 filed on Jan. 14, 2011 (now U.S. Pat. No. 9,020,687 on Apr. 28, 2015), which is a Divisional Application of U.S. patent application Ser. No. 11/396,843 filed on Apr. 3, 2006 (now U.S. Pat. No. 7,899,583 on Mar. 1, 2011), which is a Non-Provisional U.S. Patent Application claiming the benefit of U.S. Provisional Patent Application Ser. No. 60/670,097 filed on Apr. 12, 2005; and B) a Divisional Application of U.S. patent application Ser. No. 14/285,439 filed on May 22, 2014, which is a Divisional Application of U.S. patent application Ser. No. 14/285,406 filed on May 22, 2014, which is a Divisional Application of U.S. patent application Ser. No. 14/285,332 filed on May 22, 2014, which is a Divisional Application of U.S. patent application Ser. No. 14/285,273 filed on May 22, 2014, (now U.S. Pat. No. 9,204,257 on Dec. 1, 2015), which is a Divisional Application of U.S. patent application Ser. No. 14/285,209 filed on May 22, 2014, (now U.S. Pat. No. 9,204,251 on Dec. 1, 2015), which is a Divisional Application of pending U.S. patent application Ser. No. 13/135,421 filed on Jul. 5, 2011, which is a Divisional Application of pending U.S. patent application Ser. No. 12/932,811 filed on Mar. 7, 2011 (now U.S. Pat. No. 8,941,485 on Jan. 27, 2015), which is a Divisional Application of pending U.S. patent application Ser. No. 12/069,899 filed on Feb. 13, 2008 (issued as U.S. Pat. No. 7,924,149 on Apr. 12, 2011), which is a Divisional Application of pending U.S. patent application Ser. No. 11/472,706 filed on Jun. 22, 2006 (now U.S. Pat. No. 8,896,485 on Nov. 25, 2014), which is a Divisional Application of pending U.S. patent application Ser. No. 11/429,864 filed on May 8, 2006 (now U.S. Pat. No. 8,836,580 on Sep. 16, 2014), which is a Non-Provisional U.S. Patent Application claiming the benefit of U.S. Provisional Patent Application Ser. No. 60/678,947 filed on May 9, 2005, and C) a Divisional Application of U.S. patent application Ser. No. 14/285,439 filed on May 22, 2014, which is a Divisional Application of U.S. patent application Ser. No. 14/285,406 filed on May 22, 2014, which is a Divisional Application of U.S. patent application Ser. No. 14/285,332 filed on May 22, 2014, which is a Divisional Application of U.S. patent application Ser. No. 14/285,273 filed on May 22, 2014, (now U.S. Pat. No. 9,204,257 on Dec. 1, 2015), which is a Divisional Application of U.S. patent application Ser. No. 14/285,209 filed on May 22, 2014, (now U.S. Pat. No. 9,204,251 on Dec. 1, 2015), which is a Divisional Application of pending U.S. patent application Ser. No. 12/587,042 filed on Oct. 1, 2009 (now U.S. Pat. No. 8,866,876 on Oct. 21, 2014), which is a Divisional Application of pending U.S. patent application Ser. No. 11/429,864 filed on May 8, 2006 (now U.S. Pat. No. 8,836,580 on Sep. 16, 2014), which is a Non-Provisional U.S. Patent Application claiming the benefit of U.S. Provisional Patent Application Ser. No. 60/678,947 filed on May 9, 2005.

FIELD OF THE INVENTION

This invention is directed generally to the field of navigation and, more particularly, to a method and system to be used to provide infrastructure that can enable indoors or outdoors navigation and special Location Based Service (LBS) based applications in a mall, a store, buildings, a department store, and the like and to provide local based services directly to the user's cellular or mobile telephone.

BACKGROUND OF THE INVENTION

The scope of the present innovation:

The disclosed invention resolves a great deficiency in the technology available for local businesses especially indoor or in places and area where GPS or other existing technology can't provide indoor navigation and the accuracy needed. Location Based Services (LBS) represent a huge advertising and mapping market—estimated at over $150 billion a year. Location Based Services (LBS) represent a large opportunity in the navigation market that has not been explored yet.

Existing System and Industry Trends:

Local mapping today is mostly paper: Mall maps, store maps, mapping of department stores, commercial buildings, hospitals, schools, campuses, municipalities, shopping centers, down town districts, indoor facilities, building maps, parking areas, parking garages, amusements parks, subway systems, transit maps, museum maps, area attractions maps, hotel and resort maps Cruise ships and even more importantly the emergency maps and procedures posted in buildings.

Factors in Local Mapping:

Local maps can be of either indoor or outdoor locations.

Local maps are available on paper, on the web and in some cases on a kiosk in the facility.

A high degree of accuracy is needed in order to provide usable maps for navigation indoors, such as an accuracy that is smaller than 10 m to a store, a parking space, or any other desired location.

A Global Positioning System (GPS) cannot provide acceptably accurate mapping as it is only accurate to within 100-200 feet. This is the reason that the GPS industry does not provide this type of mapping. The same is true for cellular network providers, as the accuracy is also 100-300 feet, and then the system is only applicable when the GPS signal is available. The GPS signal availability is often a problem when the receiving unit is located indoors and also when operation of the cellular system is most needed: in an emergency situation when most of the cellular network fails due to high demand, damaged infrastructure, and the like. Again, this is the reason that there is no local mapping available for cellular users. (Local mapping equates to accuracy in finding a store, room, or parking level within 5 m.)

At the time of the original application, there is no indoor navigation solution and no infrastructure that can answer to that need. The most recent technology provides access to a user's location through a combination of group "social networking" and a "buddy list".

Most technology available today attempts to "locate" a moving user in an area. The disclosed invention reverses that idea and lets the user navigate the local area on the local maps.

Indoor navigation vs. Outdoor Navigation: Pedestrian navigation is more than locating and navigating, most likely the pedestrian is at or near their destination already. There are two possibilities, either the pedestrian is in unknown surroundings and their task will be to explore the surrounding or they are looking for a specific product. For example, their defined goal can be buying a new pair of shoes, getting a book, just going to shop around, exploring a new location, new deals, sales specials, simply sightseeing, and the like.

The theory behind the invention is based on the belief that "you are what you do", meaning the user is seeking a predetermined service, special sales, coupons discount, or any other deal. This is one exemplary key to the present invention.

The main task of indoor navigation is to show the user where the specials, sales, and coupons and directly navigate the user to the associated location. The integration of multimodal journey planning and guidance to dynamic waypoints, sales, specials, and the like. The complex public interchange facilities are not adequately addressed by existing systems.

A waypoint is a fixed location with known address location, longitude and latitude and coordinates. The disclosed navigation system is capable of storing a database of waypoints for the following purpose:

Waypoints mark a destination, a point along the way to a destination, or a point of reference. Normally, in navigating, a "route" consists of one or more waypoints. To traverse a route, the user navigates to the nearest waypoint, then to the next one in turn until the destination is reached. The system has the ability to compute a great-circle route towards a waypoint, enabling them to find the shortest route even over long distances. The system enabling users to locate a destination on a map and define it as a waypoint. The system is intended for navigation; it can generate a suggested route between two waypoints, based on the cartographic database. The system indicates the user's current location and gives advance notice of an upcoming point.

In some aspects, indoor navigation looks simpler than outdoor navigation. For instance, the geographical area covered is much smaller and the expected speed of travel (walking) is much slower. However, other aspects make indoor navigation actually much more challenging. First, among these is the unsuitability of a Global Positioning System (GPS) and related technologies. Second, in a complex indoor environment, the requirements are more stringent. For example, vertical positioning of a topology and a need for accuracy being more precise than a 5 m distance to the store, the product, and even to the aisle or the parking space cannot be achieved with today's existing system.

The indoor market represents much greater potential than outdoor navigation, as on average individuals spend more than 90% of their time indoors.

The objectives and goals behind the present invention include:

The technology behind the present invention is quite simple: a direct communication between the user device (such as a cellular telephone or mobile telephone) and a Wi-Fi or Bluetooth enabled device (commonly included in new mobile telephones), and Wi-Fi or Bluetooth tags (also referred to as sensors or beacons). The Wi-Fi or Bluetooth enabled devices are installed in known locations within an area (such as a building, a store, a facility, and the like). The communication is provided without relying on GPS, local centralized servers, Internet bandwidth or even cellular communication, or cellular identification (ID) they can be supportive are but not essential.

The main concept is to use existing, off-the-shelf technology and devices with a minimal cost of deployment and to provide a simple indoor and/or pedestrian technology, which delivers accuracy with an integrated suite of applications especially designed for the user (such as a shopper) within an indoor environment.

The system includes:
  a. An ability to load local mapping at the facility or pre-load local maps via an application or the Internet prior to arrival at the area.
  b. Ability to have special navigation software either as an add-on to existing navigation on the user's cellular telephone or existing navigation system (car, mobile).
  c. Ability to deploy Bluetooth beacons in the local area where each beacon will be installed in a known location or a waypoint to provide the infrastructure needed to navigate in the area. The infrastructure provides a very low cost and fast deployment beacon system.
  d. Ability or option to use the log of the user Bluetooth identification (ID) or the Bluetooth naming extension as a key (not the cellular telephone number) for future marketing purposes or for emergency use. This aggregation of data will be invaluable to retailers, etc. for example Bluetooth enabled cellular telephones or old Bluetooth headphone can be used as beacons (potentially a good use for millions of old cellular telephones).

System Segments:

Beacons: The beacons are Bluetooth or tags installed in known locations in the area or facility. Each beacon represents or transmits information associated with at least one of: a waypoint, one or more store or special sales, places, and the like.

Scanner detection: Whenever a mobile telephone or mobile device with a Bluetooth capacity is switched on and loaded with the subject application, it will periodically scan the area for the associated Bluetooth beacons. Proximity to the tag or beacon will determine the location of the user on the area and/or facility map.

Navigation: A navigation route can be plotted between waypoints, a store, or other places on the map.

Sales or marketing tools options: The disclosed system works by passively observing the initial part of the scanning of movement. The disclosed system does not monitor or listen to conversations or text messages. Nor does the system transmit or intercept any information or interfere with the mobile network operators in any way. The disclosed system is a scanning detector done by the user (not a receiver or transmitter) which can observe the unique identifier (Bluetooth ID or key set) of the device (not a telephone number or name.) and aggregate resultant data.

Example of Scenarios:

A user in a mall can load associated maps of the mall from a Bluetooth WAP system (which can be inside the mall directory), directly to a cellular telephone using a Bluetooth communication.

A Bluetooth navigation application on the user's mobile or cellular telephone will scan signals from known locations. The Bluetooth beacons can be used determine the user's location on the local mall map (the same way as a Global Positioning System (GPS)) with accuracy of less than 5-10 m. It is noted that the greater the number of beacons with a shorter signal range results in a more accurate location process.

The associated assumptions are based on the following facts:
  a. Globally, more users carry mobile telephones, more than any other device.
  b. A Global Positioning System (GPS) and existing mapping are not accurate enough to handle local mapping needs, particularly indoors, where satellite signals are not available.
  c. On average, people spend more than 90% of their time indoors.
  d. The Bluetooth protocol is the most used communication method today and it is installed in more than 85% of all new cellular phones. (less than 5% are Wi-Fi)
  e. Bluetooth can recognize other Bluetooth devices in the close proximity.
  f. The technology already exists.
  g. The disclosed innovation is based on direct communication scanning the Bluetooth beacons and the user's cellular telephone without the use of a cellular network, use of the Global Positioning System (GPS), Internet access, or access to a central system.
  h. The available local advertising marketing is huge with over $150 billion in revenue in the US alone.

Indoor Location Based Services (LBS) applications can include:
  Nav4Parking
  Nav4Realty
  Nav4Mall
  Nav4Sale
  Nav4Museum
  Nav4Show
  Nav4Train
  Nav4Sign
  Nav4Emergency
  Nav4Conference
  Nav4ThemePark
  Nav4Event
  Return2Parking The present invention offers a complete suite of applications from finding an available parking spot to navigation of indoor malls and/or stores and with a capacity to navigate to emergency exits with a low cost to implement and with a business model that can be used to attract customers.

The application represents a big opportunity in the navigation market and will open up new avenues for companies from telephone operators, mall store department store owners, to navigation and mapping companies.

The present invention provides a low cost and easily deployable infrastructure for local based navigation in both an outdoor environment and in an indoor environment without the need for Global Positioning System (GPS) and/or access to a cellular network. Moreover, the concept is especially suitable for local area (indoor and outdoor) services when and where the Global Positioning System (GPS) and/or the cellular network can't provide a solution and the accuracy needed to provide such navigation (10 m or less).

The present invention integrates existing Bluetooth technology that is proven to be stable, simple, inexpensive and mature in market use. Moreover, it is a common communication tool and is available on most of all new mobile telephones.

System Architecture:

The infrastructure consists of Bluetooth beacons installed in known locations within a local area. The beacons will respond to Bluetooth operating device scanning inquiries made by a user's Bluetooth enabled mobile or cellular telephone or other Bluetooth enabled device operating an application program.

The known location of the beacon is set in a small local database: the table of the beacon (waypoints are equal to the beacons identities according to the Bluetooth address or name of the beacon) is attached to the local area mapping of the area.

The local area map (mall map, store, building map, area map, etc.) will be available to be downloaded via a WAP system at the entrance of the building, mall, area, or the directory places to provide the mapping for the navigation.

A user can also download the map information from a website, such as www.indoormapping.org prior to approaching the location where the user may need navigation. The disclosed system creates an indoor mapping portal, such as www.indoormapping.org.

A user's Bluetooth portion of their mobile telephone will scan the local area for the location beacons. When a user is within proximity (5-10 meters) of the beacon, the location beacons respond, providing room level navigation accuracy. With multiple beacons installed and possibly receiving more than one beacon's signal, a simple triangulation calculation and options for signal strength will determine the exact location of the user on the map of the local area.

Other signals not on the database list will be ignored.

There is a mixed use of beacons and WAP depending on the application. For example, in a mall application, the stores can have a WAP to deliver more content to a user's mobile device or cellular telephone, where the beacons serve as navigation antennae and waypoints to help the user navigate about the area.

Sales sense, next generation marketing tools, the behavioral option module is as follows:

Recent published research showed that on average individuals spend 90% of their time indoors. Moreover, according to research, indoor navigation may be more important than outdoor navigation and may represent a huge new market.

The disclosed technology allows shopping centers, malls, department stores, buildings, airports, train stations, exhibition centers, museums, and amusement parks to understand the way that their customers or passengers flow through their premises. At the same time it provides the user (such as a shopper) with unique indoor navigation capability without compromising user privacy.

The disclosed innovation will allow, for the first time, the navigation and GPS industry to tap into a localized advertising market, estimated to be over $134 Billion in the US alone.

The disclosed technology provides a reliable method for identifying the path habits and the behavior that people take through an area.

There are a number of advantages to the disclosed technology including:

Extremely large sample size as mobile penetration is above 90%, shoppers remain anonymous, and the system maintains an accuracy to within 5 m based upon use of Bluetooth technology.

For retail areas, malls in particular, the advantages of understanding shopper behavior are significant. Such information can assist the mall to:
  Evaluate and improve their retail tenancy mix by identifying which stores shoppers consider complementary,
  Identify underutilized areas in the mall,
  Understand the impact of anchor stores on the mall,
  Measure the implications of particular promotions or center events, Assist with planning day-today mall operations Provide add-ons for the shoppers,
Provide shoppers with a "web" like shopping experience,
Provide shoppers with incentives and/or advertising,
Increase security, and
In an emergency, provides the shopper(s) with alarm and notification.

The disclosed technology would be the only system available that can continuously and accurately gather information along shopper paths without the need for Internet or cellular communication and all without compromising the shopper identity (ID) or his privacy.

Over the past six (6) years the proposed concept has evolved into a unique and innovative system and method that can also provide a way of surveying the behavior and preferences of the user shopper simply by observing the anonymous signals (encoding Bluetooth naming key plus the Bluetooth ID) given off by their mobile or cellular telephones and at the same time provide the shopper with a unique special application for indoor navigation.

The present invention offers the next generation approach to the Location Based Services (LBS) market, especially to indoor applications and to areas where a GPS cannot provide accurate navigation and Location Based Services (LBS) services.

The anonymous data collected using this technology can be used to provide trend reports showing which shops are most visited and at what times, whether there are sufficient public facilities to serve the visiting shoppers or whether more security staff are needed to name only a few of the potential benefits. Ultimately, the data collected by the proposed system assists shopping centers to become more in-tune with their customers so that they can create better, more pleasant places to visit.

The analytics associated with the present invention can turn a shopping center, a department store, or a store into finely tuned site, enabling mall or store owners to direct the flow of traffic efficiently around.

In contrast to alternative techniques, there is no device that tracks the user's cellular telephone. In the proposed method, the user's device (such as a cellular telephone) scans and tracks beacons or tags along the route, whereby each scan includes the cell's unique Bluetooth identification (ID) (think IP address), and while these identifications (ID's) help track the movement of the signal and its owner, the system doesn't reveal the identity of the user. This is a more precise method than what GOOGLE maps uses to detect a general location on a mobile telephone by cell towers which are accurate between 300-1000 m compared to the accuracy of the present invention, which is below 10 m.

Some reports about shoppers show how valuable behavioral information actually is, and the profit opportunities that come along with this.

Where they go?
Where they go next?
Where they do what?
When they do what?
Who does what?
Understand behavioral patterns across demographics. Similarities, differences, and much more.

Sales Sense User Preference Optional Module:

Every day millions of people access the Internet and enter their profile, personal information, or answer questions about their preferences in order to access a service and/or site, to get incentives, coupons, specials, and the like. These sites use the information for marketing and in some cases, share or sell the information. Recent research has found that most people are willing to give information for incentives.

Using the profile and records, the surfing habits of the user (IP address) is the way that all the search engine companies make money on the Internet. At the same time they try to direct the content to the user according to the user's profile and/or habits.

But what about real life? As individuals spend more and more time indoors (again, according to recent research, people spend more than 90% of their time indoors).

A scenario of searching for store, an item, special sales, and coupons is repeated again and again. The question is how can the system transfer the success of the Internet marketing tool and the easy search for the real life? That is the main idea behind the disclosed invention. What if one can take the profile and/or the user input with them anywhere and not depend on any communication at all; no Internet and no cellular communication is required and, more importantly, without compromising the user's identity. Moreover, the user is in complete control over their privacy, more control than when the user is surfing the Internet!

In the disclosed innovation, using the associated software, the user enters their profile sales preference and their profile sales preference is encoded into the user's cellular telephone. Bluetooth naming as a key (Sequence of numbers and letters, much like a Vehicle Identification Number (VIN) in cars), the key takes part of the Bluetooth device's address and the user's profile to encode a key.

There are three (3) ways in encoding generating the key:
(A) Set segment: Segment keys are not unique and help to setup the user segment only. In this case the key is not unique and sharing the key presents no privacy issue.
(B) Generate a unique key to be used like the Internet IP. This can be use with minimal user exposes or when users are registered customers and willing to receive additional incentive as store customers.
(C) Create a dynamic key and multiplies profile according to location and/or user's preferences.

The profile can include: Gender, age or age range, and sales preference (interest), and does not include any personal profile. The profile may be the same as seeing the user and recognizing their gender, age-range, and other preferences just by looking at the user. The user identification (ID) does not reveal any kind of information that most of websites ask for in a registration process and no personal information, wherein the user's name, address, and/or telephone number are exposed.

As part of the associated suite of Location Based Services (LBS) applications, the user's mobile telephone will scan the area for the beacons or tags. The infrastructure of beacons will provide accurate location determination and trigger third party delivery of the right content information to the user according to a decoding of the user key and location will allow the third party to use the user preference segments and provide the user with ads, specials, and incentives according to their profile. "Your customer is telling you what they want, are you listening?"

The main idea behind this is to provide the user with pin-point content according to their desired preference at the location and also direct or navigate them to the desired location where they can find the store, sales, a special, coupons, or any other information the user is looking for. At the same time, there is also a benefit to the sale, mall, or store owner by getting the next generation's sales tools, getting customers' habits and their sale's profile, and able to serve better and accordingly the customers.

In the sales sense, a user preference module is an add-on to the sales sense marketing where it joins the user's behaviors module to create a very unique Location Based Services (LBS) business and marketing model the analysis of these spatio-temoral data can supply high level human behavior information valuable to urban planners, local business and the Local Based Services (LBS) marketing.

Merchant (Mall, department stores, other store) indoor applications can all be included as part of a Nav4mall or a Navstore suite.

The following indoor applications can be enable to use indoor by using the associated deployed beacon infrastructure:

Map and indoor Navigation is an application which brings the local mall and/or store map to the digital age, allowing download at the directory stand or pie load from Internet site prior to arriving. The application provides an ability to navigate from waypoints to waypoints on the map directory, essentially bringing the store and/or mall directory to the cellular telephone.

Search and Find is an application where the store and/or the place where the item or products that are on the directory represent waypoints (beacons or tags) on the loading maps.

Sales/specials is an application where discounts, sales, and coupons can be added-on or a replacement to a mall or store flyer, wherein the application provides the shoppers at points in the mall or store, it can even direct the user (such as a shopper) to the aisle with the products and/or coupons and directs the shoppers to what they looking for.

Parking and return2parking: Although not directly the same beacons (for the parking the invention uses long range beacons where in store and/or mall the beacons are short range), this application is a service which assists the user in finding available parking spaces and a process for informing the user of a location where their car is parked.

Info is an application that provides information about events, restrooms, ATM location, seating area, kid's playground(s), fountain(s), public telephones, and the like to the user.

Emergency: This application is a very important part of the present innovation. This application offers a solution to provide the user with a unique alarm and notification of an emergency situation without depending on other communication links, such as cellular telephones, which are prone to failure in emergency conditions. The disclosed innovation provides the user within a structure (a building, a mall, a store, and the like) an emergency procedure according to the user's location and, in emergency condition, will help navigate each user to safety.

Panic: Panic is an application that enables the user to initiate a beacon locating transmission to help others find the user in an emergency condition.

Regarding Privacy: The system does not collect personal information such as name or telephone number. It does, however, record the mobile telephone's Bluetooth identification number to build a profile of the user or the use of the mobile or cellular telephone in the area. It is like surfing the web here a user's IP address is recorded for future marketing statistics and surfing habits (with permission from the user). Also as part of the process of introducing the encoding key into the Bluetooth device (user's profile) as describe in the sale sense part, the privacy and security increase to the level where viewing the key broadcast by the Bluetooth device can't reveal any user's identity unless the user requests to be register to get incentive specials, sales, etc., even then, the user's name or other personal ID are secure and only the Bluetooth ID and/or key are recorded.

Marketing: By directly targeting the consumer standing right outside a business, an event, or walking toward a kiosk or restaurant, merchants can maximize their marketing budget while incorporating a new, inexpensive and effective form of advertising.

The user is in complete control. They can disable their application at any time or just reject content, there is no spam effect and the user is attracted by incentives rather than generic promotions. In a mall like environment a user's incentive to use of the disclosed innovation can be further enhanced with the use of the associated advantages and packages.

Isn't this all a bit like "big brother"? Not at all, and it isn't even "little brother. It's much less intrusive or invasive than existing methods that are already in widespread use. For instance, CCTV cameras and number plate monitoring as they do collect personal information such as your image or car number plate. The disclosed innovation represents the next generation shopping experience in shopping centers, malls or stores and fits very well with today's business model. Such a service can be offered for free to the users and backed by advertising and the use of the data by the stores. Such service and application and the ability to include the full suite of applications especially designed for shopping malls and/or stores and include the emergency part of it will also ease the fear of locating the user or any other privacy issue.

Who benefits from the disclosed technology? Everyone benefits from the collected trending data. The processes disclosed herein provide a way to collect instant feedback from shoppers without having to bother them for information. In the old days, shopping locations would have employed researchers to survey consumers to collect information. The collected information would take time to collate and the response rates are very low these days, as shoppers have increasingly become reluctant to stop and share their feedback. Hence, the present invention provides a very effective method in the same way that TV networks know how many people watched particular programs and use that information to discern what programs to produce and how to calculate the costs advertisers must pay to promote their products during different timeslots. The disclosed system provides the equivalent for shopping center owners and their resident retailers. It is believed that introducing the disclosed system and the marketing tools above can help the users and the sellers upgrade the real shopping experience of today with the advantage of the web like tools.

The disclosed innovation represents the next generation shopping experience in shopping centers and malls and fits very well with today's business model. Such a service can be offered for free to the users and backed by advertising and the use of the data by the stores. Such service and application and the ability to include the emergency part of it will also ease the fear of locating or any privacy issue.

For the first time, the shopper will experience Internet type marketing in the traditional sales and advertising venue.

The following are benefits consumers could see from shopping center stores, resorts, cruise ships, and others using the disclosed technology:

A. Better in-mall inside events; the disclosed system can monitor how successful they were by monitoring the sheer volumes of people attending and for how long.

B. Provide shoppers and/or guests with next generation sales tools: navigation in your mall store area ships or facility directly to the sales or specials that you want them to go to.

C. Add on to the store, the mall, the ship, the hotel, the resort, the building directory, and the in-store mall, the cruise ship, the resort, the building, and the like.

D. Take the guessing from the customer's next wants; then send them directly to the products coupons special they might want.

E. Improved public transport links—by monitoring how people traveled to a centre. With the government's current emphasis on helping people to use public transport more effectively, having this kind of information can have a very positive, local environmental impact. Busy shopping center can otherwise create large volumes of extra road traffic, also with the disclosed search4parking and return2parking application can improve traffic, saving time and gas.

F. Eliminate congestion within the shopping center: The disclosed innovation can help centre management understand whether opening hours need to be extended or whether the centre layout needs to be improved to avoid congestion.

G. Improve shopping center and public facilities efficiency: The disclosed innovation's data helps managers to understand which parts of their facility are very busy which means they know when to deploy extra employee, cleaning personnel, security, and the like to ensure proper service.

H. Better security: Over crowding also leaves shoppers vulnerable to pickpockets and other security risks. The disclosed system can identify congested areas and ensure security personnel are deployed appropriately. And in an emergency, the disclosed system can provide instant alarm and notification, even if the cellular communication or another communication system is not available.

I. Improved mix of stores and centre layout: The Application helps identify which stores are popular and which are not. making sure that the best possible layout and mix of shops is provided for visiting shoppers. If some shops are unpopular they can be switched for brands that customers actually want.

Altogether this makes for a much better shopping experience. It is believed that shopping should be an enjoyable pastime. Who wants to go to shopping center that are congested, poorly laid out, have dirty toilets, are badly positioned for transport links and which pose a security threat to visitors?

How do shopping centre owners and retailers benefit? The benefits for shopping center owners using the disclosed technology are huge and there are many possible uses for the information gathered. The system can help shopping center owners get a better understanding of how people use their shopping center such as the order of stores they visit and the time they spend in different areas of the shopping center.

These days, visits to shopping malls are falling with increased competition from supermarkets, retail parks, and the Internet. With visit frequency going down, it is critical that the shopping experience at the mall is exceptional and that is where the disclosed system comes in. The information can assists malls at all levels, from the very mundane to the more strategic questions that they face, such as whether or not the shopping mall has the right mix of retailers across the mall.

Similarly it could help museums identify their most popular exhibits and help exhibition companies plan their venues more carefully around visitor traffic flows.

The instant invention provides the shopping center with quantitative feedback on whether the changes the management of the shopping center makes in the mall or general area are successful. One of the ways to do this is by looking simply at how long shoppers or guests tend to stay within a mall or area.

Don't retailers already measure shopper numbers? Yes they have infrared cameras and counting machines that monitor and count the numbers of visitors to their stores. This measure is known as footfall and has been used by retailers for many years. The disclosed system provides another level of data by looking at the aggregate paths that mobile phone carrying visitors take and the length of time they spend, referred to as "dwell time".

In the past an area, malls, a building, a cruise ship have focused solely on looking at the numbers of shoppers or guests that they are drawing through the doors (footfall) but when combined with dwell time, they can get a much more accurate predictor of their performance.

The system has no idea who you are as an individual, as the system only looks at the path the user's phone takes. The process is analogous to looking at a dot moving around a screen. In isolation, this information isn't too interesting until one looks at the wider patterns and trends and see lots of dots taking the same route or visiting the same areas of the mall.

What is the Bluetooth identification (ID)? A Bluetooth identification (ID) is like an Internet Protocol (IP) number assigned within a computer network or the Internet. The Bluetooth identification (ID) does not contain or reveal the phone number associated with the mobile device. The phone number and/or the electronic serial number is a reference which the cellular network operator uses to identify your phone. The system uses part of the information as a key to calculate anonymous shopper paths.

The linkage between the Bluetooth identification (ID) and your personal information is not publicly available. The system does not use or have an interest in this information and it would be a breach of the data protection act for the proposed system (or anyone else) to obtain this information without the user's permission. The system considers the Bluetooth key and/or identification (ID) to be analogous to the Internet Protocol (IP) address that is assigned to a user, each time the user logs on to the Internet. The Bluetooth key and/or identification (ID) contains no more information than an Internet Protocol (IP) address. In fact this analogy is very helpful in explaining how the disclosed system works in more detail, as the following point explains.

The proposed process does not detect any personal information and has absolutely no idea who the user is as an individual. Although the system has an option for users to register, such as mall and/or store customers, to provide more details about themselves (still excluding any real identifying information). This can be considered similar to a membership card, which would provide the user with incentives, coupons, or special discounts if the user participates in the program. Moreover, recent emergency events prove a need for emergency and notification to the right people at the right time. By keeping the Bluetooth key and/or identification (ID) of the Bluetooth devices that are currently located within the area and/or facility, a Nav4emergency feature can provide instant emergency alarming, emergency notification, and emergency navigation, directing the user to and along an exit route (to safety); all without revealing the user's identity (ID) or breaching a privacy of any user.

Next Generation Marketing (the business model): The web advertising and the main focus of search engine success is based on technology that tracks the web user's habits and provides the web user with related ads according to the web user's interests.

Using the disclosed infrastructure of a Bluetooth beacons and the associated applications in a mall, a store, a shopping center, or in any other indoor facility, the present invention will represent a very unique ability to bring a web-like shopping experience by its ability to maintain records of the user's surfing or shopping habits in the shopping center, the mall, or the store. The system will provide a better shopping experience (coupons, specials, and sales according to the user's shopping habits) and service to the shopper.

Even though it may look like a privacy issue, the add-on services, the application, and the idea that it may save the user's life (nav4emergency application) combined, with the fact that it does not reveal the person's name or telephone number, it is the same as the everyday use when a user is surfing the Internet, as the user's IP address is recorded by web sites and search engines and provides the basis for the ad sense or other web marketing tools, which can be referred to as sale-sense.

It is believed that introducing the disclosed system and the marketing tools above can help the users, the merchants, and property management to upgrade the real shopping experience of today with the advantage of the web like tools.

The present invention represents the next generation shopping experience in shopping centers, malls, and the like, and fits very well with today's business model. Such a service can be offered for free to the user and backed by advertising and the use of the data by the stores. Such service and application and the ability to include the emergency part of it will also ease the fear of locating the user or any other privacy issue.

For the first time the shopper will experience Internet-type marketing in the traditional sales and advertising venue.

The disclosed innovation provides valuable solutions that enhance the effectiveness of ad campaigns. The ability to optimize performance in real time has a positive effect on advertiser satisfaction. The fact that this service is well integrated into the disclosed system is a tremendous advantage.

The disclosed innovation is a performance-enhancing technology, providing great data and allowing improved customer service.

It can be an extremely effective way to optimize the performance of offline and/or online advertising campaigns in the mall and/or store environment. For excellence in client services the idea is a clear win-win for everyone.

Helping to understand where users are going in the mall and/or store in real life and their buying behavior patterns will allow the merchants to continually adjust offers, placements and creative content to improve buy-through and maximize sales.

The disclosed system will evolve the mobile content into a bonfire revenue center that will benefit the shopping mall operator and merchants alike.

The user is in complete control. He can disable his application-blue umbrella application any time or just reject content, there is no "spam" effect and the user is attracted by incentives rather than generic promotions.

Probably the best technical analogy would be to compare the disclosed technology with existing web-based systems that measure viewers of web sites, for example GOOGLE ANALYTICS.

These systems work by embedding tags within each page of the web site being measured, so every time a visitor views a page on the site the tag is flagged. This enables the system to collect information on how a visitor viewed a site. This system won't collect any personal information but it will collect the temporary Internet address of your computer to uniquely identify you (not as an individual but for instance as "Visitor Xyz75a") as well as information on how you use the website such as the order of pages you visited or how long you spent on each page. In a very similar observation, the unique Bluetooth naming key that setup a user pre define profile key to provide the user with advertisements, specials, and/or incentives, according to their segment and all with complete user anonymity.

Recently published research shows that, on average, people spend 90% from their time indoors.

Moreover, according to the research, navigation in an indoor environment may be more important than in an outdoor environment. Navigation in an indoor environment may represent a huge new market.

The disclosed system will allow, for the first time, the navigation and GPS industry to tap into a local advertising market estimated to be $134 Billion in the US alone. The disclosed innovation represent the elements of analysis, plus direct local content, plus indoor navigation; all collectively provide a next generation location based model.

The following discloses indoor location technologies. Various technologies are used for wireless indoor location. These may be classified in two aspects: (1) The algorithm, where the method used for determining a location is used. (2) The physical layer, where wireless technology is used to communicate with the mobile device, such as a mobile telephone.

Location Methods

Typically, methods used within indoor locations are borrowed from an inventory of outdoor Global Positioning System (GPS) location methods. Specifically, four types of methods are used indoors:

(1) Proximity Detection (PD), (2) Received Signal Strength (RSSI), (3) Time of Arrival (TOA) and (4) Angle of Arrival (AOA).

Proximity Detection (PD)

This method relies upon a dense grid of antennae, each antennae having a well-known position. But the system reverses the normal detection or localization method. In most cases, the mobile device is detected by a tag or beacon. Conversely, in the disclosed method, the user's mobile device, using special Bluetooth based software, scans the area for a known location and a known list of beacons or tags install in the area, the facility, the store, and/or the building. The beacons or tags have a known name or identifier (ID) that is broadcast and when the user's mobile device is within a proximity of the beacon and/or tag the user's mobile device is considered to be co-located with the beacon and/or tag. When more than one signal is detected by the user's mobile device, a simple triangulation process is used to determine a more precise location of the user's mobile device. In any case, the short range of the Bluetooth signal in this case and in an indoor environment results in a big advantage as the accuracy can be less than 10 m.

The disclosed method is relatively simple to implement. It can be implemented over different types of physical media, and it is the disclosed method of indoor navigation.

Like the PD method, triangulation is relatively simple to implement.

Wireless Local Area Network (WLAN) (IEEE 802.11b): This midrange wireless local networking standard, operating in the 2.4 GHz ISM band, has become very popular in public hotspots and enterprise locations during the last few years. With a typical gross bit rate of 11 Mbps and a range of 50-100 meters, IEEE 802.11b is currently the dominant local wireless networking standard.

It is therefore appealing to use an existing WLAN infrastructure for indoor locations as well, by adding a location server. Such solutions do exist in the market. One limitation of such systems is the fact that WLAN tags are relatively bulky and power hungry. Thus, such locators are mainly useful to locate WLAN enabled instruments, such as portable computers. It is noted that in WLAN, antennae are actually part of access points (Apes), through which devices communicate with the access network.

Bluetooth (IEEE 802.15)

Bluetooth is a newer wireless local networking standard that operates in the 2.4 GHz ISM band. Compared to WLAN, the gross bit rate is lower (1 Mbps), and the range is shorter (typically 10-15 meters, although there are tags with a range of over 300 feet). The shorter range makes it advantage indoor when you need more accuracy. Also, Bluetooth is a lighter standard, highly ubiquitous (embedded in most phones, Personal Data Assistants (PDA's), PC peripherals, etc. exist in more than 85% of the new cell phones). Bluetooth also supports, in addition to IP, several other networking services. Notably, Bluetooth supports serial port emulation, voice, and various types of object exchange.

Bluetooth tags are small, pocketsize transceivers.

Every Bluetooth device's tag has a unique ID. This ID can be used for locating the tag.

Bluetooth Indoor Location

How does Bluetooth location work?

Bluetooth was not made originally for location or navigation. From the outset, the standard was designed for communication, more specifically, in a Personal Area Networking (PAN) environment. However, to facilitate this task, particularly in dynamic, ad-hoc scenarios, devices need a mechanism to identify their neighbors, to synchronize, and finally to connect. Such mechanisms have indeed been built into Bluetooth. More importantly, these mechanisms can also be used to obtain an accurate location.

The approaches to Bluetooth location: Finds a tag by using one of two Bluetooth mechanisms, (1) Inquiry and (2) Paging that are used normally for link setup:

The Inquiry mechanism provides a method for a Bluetooth device to discover its neighbor's Bluetooth identification (ID). An inquiry process typically takes 5 seconds. The process concludes with the inquirer (typically the user cell phone) obtaining and collecting all of the identifications (ID's) of all of the Bluetooth devices beacons (tags) install in the area and/or facility that are in range with the Bluetooth enabled device.

The Paging mechanism follows an inquiry. The inquirer can page (set up a link with) one or more of its discovered neighbors. A paging process typically takes 1-2 seconds. This mechanism is faster, but requires a previous knowledge of the tag's identification (ID) (as well as the Bluetooth clock phase). The relevant location scenario is that of searching for a certain tag. It is the most accurate and the faster response time and it is the disclosed method indoor navigation when and where each tag is associated with a known address position, referred to as a waypoint.

Why use Bluetooth for indoor location? Bluetooth has some advantages in the context of indoor location. These include:

a. Bluetooth uses RF—in the 2.4 GHz ISM band, specifically. In this frequency range, radio waves penetrate obstacles, such as walls and human bodies, albeit with a substantial loss.
b. Bluetooth is ubiquitous—Bluetooth chipsets are being implanted everywhere nowadays (phones, accessories, computing devices, etc).
c. The fact that a Bluetooth location system can locate any Bluetooth enabled device makes it more cost-effective. This means that an increasing fraction of humans and mobile assets around would become locatable in a Bluetooth covered site, with No additional hardware cost (no tags attached). The only need is to pre-register these devices.
d. Bluetooth is a low power technology. The proposed tag can operate using a battery for more than 6 months, which is a big advantage over Wi-Fi or other technology.
e. Bluetooth is a low cost technology. The high expected production volumes (hundreds of millions annually) lead to sub-$1 per chip. This goal has already been met by several integrated circuit (IC) manufacturers. This would eventually result in a low price for the Bluetooth tags, and Bluetooth location systems would become sufficiently ubiquitous.
f. Bluetooth is a multi-functional communication standard: Location is only one of the services that can be supported by a Bluetooth infrastructure. The same infrastructure can be used to provide additional network services, particularly remote monitoring and control (by using a serial interface). In addition, Bluetooth provides voice and IP services.
g. In open spaces, relatively free of obstructions and walls (e.g. a large warehouse or a public hotspot), Bluetooth alone would suffice to provide a sub 1 meter accuracy and that is the range for locating products in a store in a mall or even go to a product in a shelf.

Conclusion:

The Bluetooth technology offers two unique advantages. One advantage is a penetration into the market; more than 85% of the new phones. The other advantage is the multi-service nature of the Bluetooth infrastructure that enables using the location access tags for other purposes, such as for navigating, remote monitoring and control, and for a variety of Internet Protocol (IP) and messaging services.

Applications:

The system use and costs should scale well with its ability for multi use in an emergency and in non emergency to provide local navigation on malls, stores, campuses, buildings, hospitals, hotels, cruise ships, resorts, malls, and the like, without GPS or a cellular network using the Bluetooth or Wi-Fi beacon for navigation. Some of the key applications that can be enable to be use by the disclosed infrastructure are:

Nav4Mall, Nav4Store, Nav4Sale, or just University or Building Navigator: These are applications that explore the indoor mall or inside a department store, in resort or cruise ship navigate to the right place or the store or the department that you need. Navigate on the mall map, the store map, the resort map, or the cruise mapping to find your way around each respective environment using your mobile or cellular telephone or navigation system without a GPS or even without need for cellular communication at all. A new kind of service and new marketing process for the malls, store, resorts, business owners an add-on to local advertising.

With an indoor navigation based on the local map of the mall and/or store, that will provide the user a navigation to his desire location in the mall and/or store to the right, and receiving content according to his pre-defined preferences the user can be directed to a store, a product, or even an isle inside the store as well a new marketing tool to the store and/or mall owner to get the customer with a new service. The store will have also an option to provide or deliver more content (advertising, sale, coupons, promo, etc.) to the user when he approaches the store and the delivery are trigger by the associated infrastructure of Bluetooth beacons. And in an emergency, the Nav4emergency will kick in from the Nav-store mall suite of applications.

Nav4Museum, Nav4Conference, and/or Nav4Show:

These applications explore museum or conference show exhibits in a new unique and easy way, find your way around when navigating on the floor map of the museum conference or the show, indoor navigation, navigate to exhibits restaurants, cafes, lavatories, and the like, all to the user navigation or cellular telephone. Any museum conference or show provided to the attended a mapping to the exhibits, some provide also additional audio device (headset) to obtain more information on the exhibits. The disclosed innovation will provide a unique indoor tools that will allow the attending user to navigate the museum, conference or show in an easy way directly to the user's Bluetooth enabled cellular telephone, when the user reaches their desire exhibit the user will allow the Application to download directly to his cellular telephone and/or other Bluetooth device information about the exhibits. An indoor navigation to the exhibits as well to the restaurants, cafes, lavatories, and the like. Each would be applied to the navigation process or cellular telephone and based on the facility map. And in an emergency, the nav4emergency will automatically initiate.

Nav4Train (Mass Transit and/or Public Transit Navigation):

For all the users of mass transportation system the disclosed innovation will allow locate and point the user to the exact station or location on a route, an easy way to navigate in the train, subway, underground kind of system, a new way of a subway or bus mapping indoor and/or outdoor locations and directly to the user's navigation or his cellular telephone. Every day millions of people are using the mass transportation system, trains, subways, buses, each of the passengers depend on the transportation map for the route information as well as schedules and additional services provided by the transportation system. Most of the passengers of today carry with them a cellular telephone. The disclosed unique innovation will provide the passenger with the navigation inside the transportation system directly to the passenger's Bluetooth enabled telephone; the passenger will know exact location and/or station on the route as well with additional option information like schedules. A new add-on service to the transportation providers as well to the passengers, utilize the disclosed indoor navigation method, and in an emergency, the Nav4emergency application will kick in.

Nav4Theme Park (Amusement Park Navigation):

Amusement Park Navigation provides navigation processes to your desire attractions as well with a new way for register to an accelerated queuing line all in an easy way to the user cellular telephone without need for GPS Provides a new media and-on service. Ever wonder what it will be like to navigate inside the amusements park to the desired attraction, to know the schedules of the shows at the attractions and even to get your "fast pass" from a remote instead of standing in line. With the disclosed unique innovation all can be become reality and directly to your cellular telephone without the need for a GPS or even cellular communication. It is believed that the disclosed innovation can provide a new tool and service to the benefit of the amusements parks as well to the user. And in emergency, the emergency part will kick in without a need for cellular communication that tend to fail in emergency.

Cellular next "Killer Application":

Emerging technology markets are always on the lookout for that elusive killer application. The killer application is a precious, irrefutable application that makes adopters stand up, take notice, and open their wallets. Once it's found, and as soon as adopters realize firsthand the value to be achieved, that killer application eventually expands into other, more advanced areas of adoption and innovation. According to research, the next in cellular telephony will be service depend on location base programming, when the cellular telephone user will receive information according to his location.

At the original time of writing this specification, there are more than 4 billion cellular telephone users in the world. Each day, thousands more sign up. A variety of mobile devices have been developed in recent years that are capable of supporting dynamic navigation and location-based' services applications. These include wireless telephones, Personal Data Assistants (PDA's), portable computing tablets, and other Smartphone Personal Navigation Devices (PND's) and laptop computers, the disclosed concept will work even on older cellular telephones. It is believed that the disclosed innovation will meet the desire of wireless service providers to increase their average revenue per user.

SUMMARY OF THE INVENTION

In accordance with the present invention, these are the associated characteristics of the invention:

The main object of the present invention is to provide accurate indoor navigation using an application adapted for indoor environments without a need for use of a Global Positioning System (GPS), without access to a central system, and without costly infrastructure. An additional objective it to accomplish the indoor navigation without a need for access to the Internet or any cellular communication.

It another object of the present invention to provide a method to provide indoor navigation using an indoor application that employs Bluetooth enabled devices, more particularly targeting Bluetooth enabled cellular telephones.

It is another object of the present invention to provide a method using the indoor navigation application for malls, department stores, regular stores, buildings, down town centers, and other facilities and/or areas. This is especially useful, but not limit to, indoor environments.

It is another object, the present invention provides a marketing model method directed towards, but not limited to, the Location Based Services (LBS) market.

It is another object, the present invention provides a business model method directed towards, but not limited to, the Location Based Services (LBS) market.

The foregoing and other objects of the present invention are achieved by providing an infrastructure of a Bluetooth beacons or tags installed in known locations in the area or a facility. Each beacon or tag would have its own unique identity (ID) and a Bluetooth name to identify the location in the area, the beacon or tag broadcasts the identity (ID) thereof.

Mapping of the area and/or facility will be downloaded at the area and/or facility or pre download prior to arriving at the area and/or facility, the mapping contain a lookup list of the beacons or tags installed in the area represent a waypoint on the map.

In a disclosed indoor application, instead of GPS, the disclosed system can use known waypoint positions that are manually detected and identified as a demonstration of the concept of using another sensing method, such as RFID, to detect and identify the waypoints. Theoretically, it would be possible to convert the waypoint positions into GPS coordinates and emulate an external GPS data source.

The indoor application relies upon a dense grid of beacons or tags, each having a known position. But the system reverses the normal detection or localization method in most cases. Converse to the common practice where the mobile device (cellular telephone) is detected by a beacon or tag in the area, in the disclosed method, using the described Bluetooth based software, the user's mobile device scans the area for beacons and/or tags installed in the area, the facility, the store, the building, and the like. The beacons or tags have a known name or identification (ID) that is broadcast and when the user mobile is in the proximity to the beacons or tags, the mobile device is considered to be co-located with it. When more than one signal is detected by the mobile device, a simple triangulation process is used to determine the location of the mobile device based upon the known locations of the beacons or tags. In any case, the short range of the Bluetooth signals, and more so in the case when the system is used in an indoor environment, the infrastructure and system introduces a big advantage, as the process provides an accuracy that can be less than 10 m. The disclosed innovation reverses the current idea of locating the user by letting the user navigate utilizing to the sensor network of Bluetooth beacons (whose signal is sent by way points) directly to the user's mobile device. This will allow Location Based Services (LBS) (Local Base System) navigation, even indoors exclusive of a Global Positioning System (GPS) or use of a Cellular network.

The application on the cellular telephone or any other Bluetooth enabled device will scan the area and/or facility for the known list of the beacons or tags. The identity (ID) or name when a Bluetooth beacon or tag matches the list, the process enables a response with a proximity detection establishing within a 5 meter accuracy. When more than one beacon signals are received, a simple triangulation analysis can be accomplished to determine the current location. Other Bluetooth or Wi-Fi devices not on the list will be filtered out.

The locating process is established and will be displayed on the map on the device. Because the location of the other beacons or tags are known, navigation between the current location and a different desire beacon or tag representing a target waypoint is easy to achieve.

In reality no two-directional communications are establish between the beacons or tags and the cellular telephone.

The disclosed system is a navigation method based on the following unique characteristics:

One idea behind the present invention is based on a concept of direct communication between mobile telephones and a beacons and/or sensor (referred to as way points). No Internet or cellular network connectivity is needed.

The system is based on Bluetooth communication protocols, which are available on almost any new cellular telephone.

The disclosed innovation reverses the current idea of locating the user, wherein the present invention lets the user navigate utilizing the set of beacons of Bluetooth beacons (whose signal is sent by waypoints) transmitting a signal directly to the user's mobile device. This will allow for Location Based Services (LBS) navigation, even when the user is in an indoor environment. More specifically, without any aid from the Global Positioning System (GPS) or a cellular network.

The beacon signals can reach from 10 meters to more than a 1000 meter distance depending on the application. To get more accuracy, less range, and more beacons may needed so the 10 meter distance is more than needed in a building, a room, or any other suitable environment. Increasing the signal range to the box can be as simple of attaching bigger antenna.

To comply with privacy concerns, the disclosed method takes the user's privacy to the highest level. Although the disclosed method is like creating a cookie in the cellular telephone, the disclosed method is not the same as an Internet cookie, where the cookie is generated and controlled by the web sites. The disclosed method utilizes a user's profile generated by the user and controlled by the user and more importantly, encrypted and secured as a key.

The user is in a complete control. The user has a choice to turn it on or off at any time.

The proposed system respects user privacy and does not collecting any personal identification, such as the user's name, address, telephone number, or any other personal information.

Moreover the profile input by the user is encoded as a key, with multiple profiles to choose from. The possibility of recognizing the user by the key is close to none.

There are three options for the user preference:
1. Only user segments generate key, no specific user identification (ID).
2. Segments and part of the Bluetooth device ID encode as a key.
3. The user can choose to be registered (membership privilege, student in a university, school, and business, especially for receiving direct incentive specials, coupons, and the like. Registration can also be adapted for use with nav4emergency protection.

The proposed system allows the user to choose between participating and receiving incentive, special sales, coupons, and local content tailored to the user's preferences, all for free, or they can choose not to participate and pay a small fee for the service and the software. In any case, the user's privacy is still protected to the highest level compared to any normal daily use of the Internet!

There is also a great benefit to the participating user. The participating user can have full emergency notification directly to their cellular or mobile telephone and in an emergency, the user can be directed by the emergency procedure in the area, a building, a mall, a store, or any other established region, navigating the user to the exit route, even if the cellular network in the area fails due to the high volume of traffic occurring in an emergency situation, an outage, or any other disabling scenario.

In the disclosed method, there is no detection or tracking of the user. The user themselves, engages the scanning and detecting method to find the beacons in the area.

The disclosed secure encoding key method can be used to secure other applications or processing where the privacy and security are needed most in a Near Field Communications (NFC) Applications.

Other than that, an application for the benefit of the user, including parking, sales, specials, indoor navigation, informing and notifying the user in case of emergency, directing the user to along an exit route to safety, and the like.

The disclosed method can be attractive not only for shopping malls, department stores, or downtown strips, but also to high rise buildings, commercial buildings, universities, schools, museums, amusements parks, trains, subways, hotels, and other venues or locations.

It can also be attractive to search engines, advertising companies, cellular telephone operators, manufactures, GPS companies, mapping, local businesses, local advertising. The disclosed method can give the Location Based Services (LBS) a new meaning, a business model that's made easy.

A facet of behavioral targeting has been around for a while but mostly on-line, but the collection of behavioral patterns has been gaining traction among advertising agencies retargeting program is now a key planning consideration for its advertisers.

Why? The primary reason is because retargeting is a powerful means to bring lift to advertising campaign results, which generating higher conversion rates and lowering acquisition costs. Advertisers can't get much more effective than targeting a person who has shown interest in a product but didn't buy with a related ad that then gets him to buy, right?

The legacy of Location Based Services (LBS) technologies that marketers today rely on generally fail to tap the unique opportunities of local advertising market estimates to be over $150 Billion in the United States alone, people are spending more than 80% of their time indoors, but with no clear technology to provide indoor navigation and not clear business model, The advertisers, the business are disillusioned with the promise of Location Based Services (LBS) but are still longing for a solution that properly addresses the significant audience represented by the explosion of cellular telephones use and the availability of content.

It is believed that the disclosed innovation technology and business model can provide the next generation method for the Location Based Services (LBS) market to tap into the huge market opportunities.

Where the disclosed invention is unique:

The present invention is based upon a Bluetooth protocol, which, at the original time of disclosure, is integrated into more than 85% of the new cellular telephones (compare to only 5% of Wi-Fi). As explained before, the disclosed method represents more accuracy and practical deployment then Wi-Fi.

The disclosed method employs an infrastructure that enables navigation and Location Based Services (LBS) applications without assistance from GPS or cellular identification (ID), and more precise, indoor navigation. The disclosed method is not for tracking or locating user, the disclosed method is directed towards providing an easy deployment infrastructure in a building, an area, a mall, and/or a store, using a known deployment of beacons or tags that are installed in known locations in the area and serve as Location Based Services (LBS) and navigation infrastructure and a triggering mechanism to allow delivery of desired content to the right people at the right time.

The disclosed method is about navigation, and more precisely directed towards indoor navigation. The disclosed method is not for tracking or locating the user; it's about providing navigation to a user with a Bluetooth device located within a building, an indoor area, a mall, a store, and the like, by using to a known setup of tags and/or beacons that are installed in a known positions in the area.

The navigation can be for a physical location like a store, a restroom, etc., or for sales, specials, coupons, specials within an area, a store, and the like.

The navigation method would be analogous to a current GPS method, displaying information on a map of the area, the store, the mall, or any other associated region.

The disclosed method represents a very unique way of locating the exact location. In the disclosed method, the user scans the area for a known list of beacons or tags. There are no detectors and no scanning for the user's device and/or cellular telephone. The user controls the scanning of the area for the known tags. In reality, there is no two-way communication to be established. The user's device scans the area for a known tags and the determination of the location would be accomplished by the ability to scan and find beacons or tags from the list. Better interpreted, the location is established by the proximity of the user's device to the beacon or tag, noting that this process provides an accuracy to less than 5 m.

Additionally, the special indoor application can be designed especially for indoor applications, such as within a store, within a mall, within shopping plazas, finding where the user parked their car, finding and/or searching a directory, providing an emergency alert and notification, and others.

Moreover, all the disclosed features do not depend upon cellular communications or access to the Internet. For the navigation method, there is no need for central system or any expensive infrastructure. In fact, the user's device or cellular telephone in conjunction with the infrastructure beacons or tags utilize battery power and can work in a condition where power provided by the electrical infrastructure is unavailable. This capability is very important in most emergency situations.

Moreover, the disclosed sale sense marketing method comprises a unique way of delivering local content, advertising, coupons, specials, sales, and the like. The delivered content is pin pointed according to the profile or preferences entered by the user and encoded as a security key into the user's Bluetooth name or identifier (ID) to be decoded by a recipient that will decode the user's profile and/or preferences. With additional records of user behavioral activity, the process can provide simple and secure method for targeting the user for Location Based Services (LBS) services and other services like Near Field Communication (NFC).

The user profile is not a text or file that resides on the user's device. The user profile is a key encoded into the user Bluetooth naming and can be recognized only by the deliver entity that can decode the user key (like a Vehicle Identification Number (VIN)). The user profile is not the device profile and not the user device profile.

The disclosed innovation will enable a full line of indoor navigation application especially to places or areas where the GPS can't be utilized and/or where more accuracy needed.

BRIEF DESCRIPTION OF THE DRAWINGS

A better understanding of the present invention may be obtained by reference to the accompanying drawings, which should be considered in conjunction with the detailed description, all in accordance with the present invention.

DESCRIPTION OF THE PREFERRED EMBODIMENT

Figure 1:
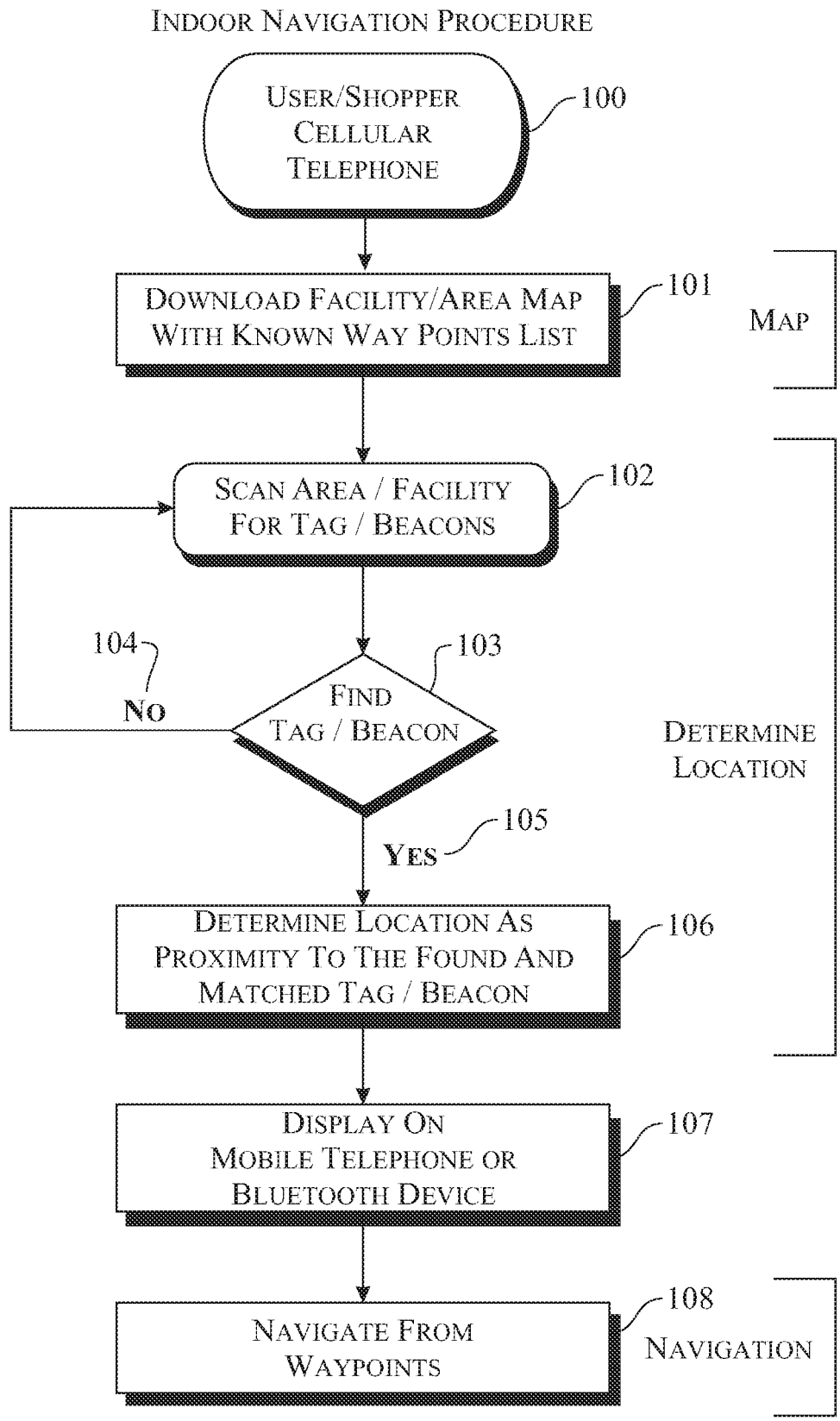
FIG. 1 presents an exemplary flow diagram describing an indoor navigation procedure.

In all the figures of the drawings, features, sub-features and integral parts that correspond to one another bear the same reference symbol.

Referring now to the drawings in detail and first particularly to FIGS. 1-12 thereof.

A flowchart illustrating indoor navigation enabled by the infrastructure according to one embodiment of the present invention is illustrated in FIG. 1. The user, carrying an operating cellular telephone 100 would approach a facility or other area with a preloaded facility or area map 101 and a known list of waypoints represented by Bluetooth beacons and/or tags installed in the facility and/or area, or the user can download the facility and/or area map 101 with a known list of waypoints upon reaching the facility and/or area. The associated Bluetooth beacons and/or tags would be installed in known places. The user mobile telephone navigation application will scan 102 the facility and/or area searching for any of the Bluetooth beacons and/or tags that are on the list of known Bluetooth beacons and/or tags. If any beacons or tags were found 103, then when found 105, the location of the user is determined by a proximity to the found and matched beacon or tag from the list of beacons or tags 106. Scanning would continue if no tags 104 were found. When a beacon or tag is found 105, the location is displayed 107 on the loaded map presented on the mobile telephone or Bluetooth device. The application additionally provides an ability for presenting navigation 108 between waypoints to the user. The accuracy of this system is below 10 m and in case of approaching signal from more than one beacon and/or tag, a triangulation method can be performed to determine the exact location of the user. The method gives the user the control and the privacy as the user's cellular telephone device is the scanner and it scans the area. In reality and the unique method there is no established communication at all as the scan reveals the beacons and/or tags names (store or exact location address/name) or waypoint location (for example, Macy's). This is accomplished without any need to establish any communication between the beacons and/or tags and the respective cellular telephones. Additionally, there is no need for access to the Internet, use of GPS, use of a central system, or even cellular communication to perform the navigation, making this solution a unique approach compared to other indoor navigation methods.

Figure 2:
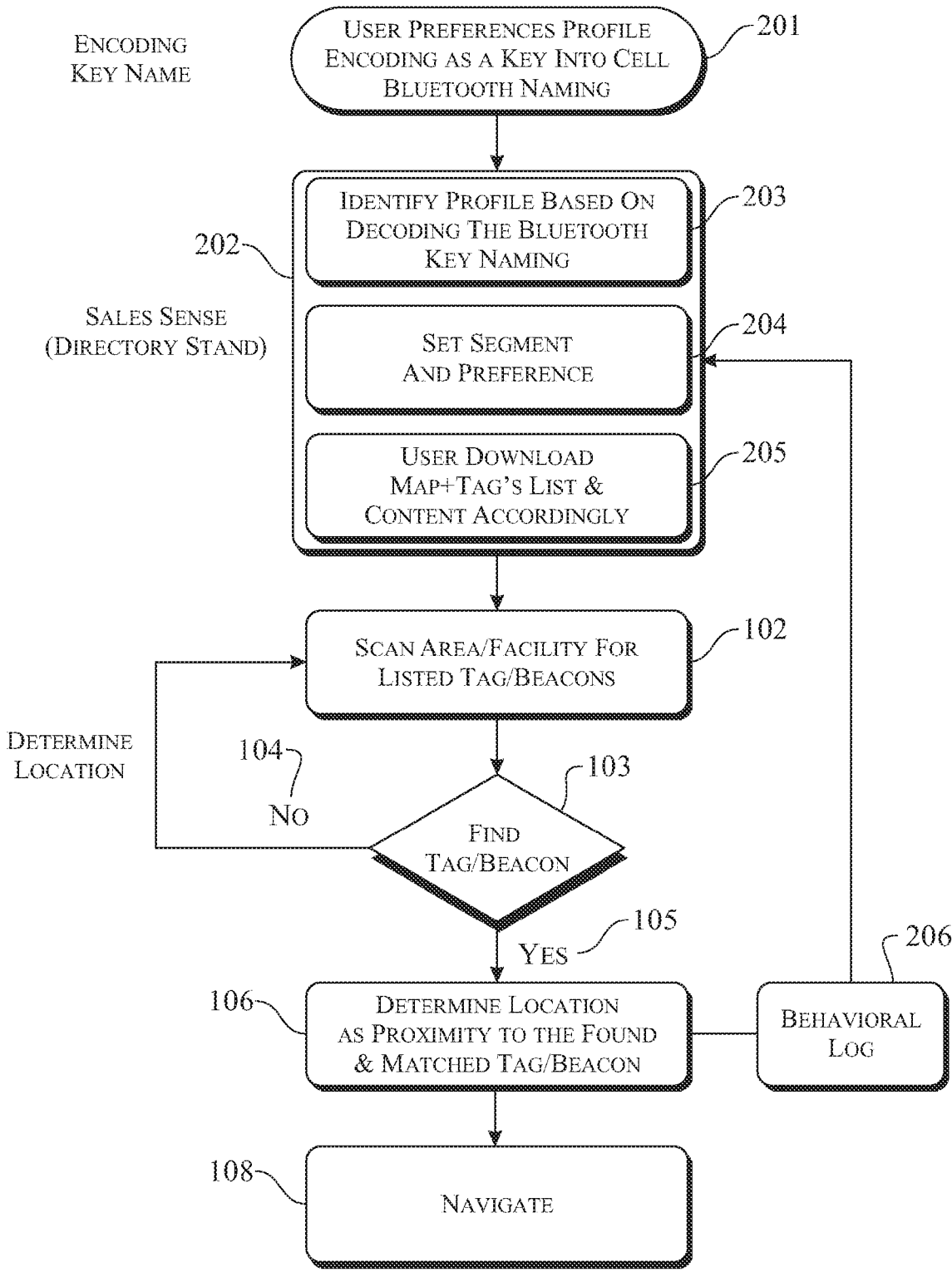
FIG. 2 presents an exemplary flow diagram describing a sales sense marketing procedure.

A flowchart illustrating of the sales sense marketing option algorithm according to an embodiment of the present invention is presented in FIG. 2. In the sales sense option method, the user inputs their profile preference into the respective application. The profile can contain gender, age or an age range, sales preferences, and any other suitable characteristic of the user. The information will be encoded into the Bluetooth naming of the cellular telephone as a key 201, such as a Vehicle Identification Number (VIN). To provide maximum privacy and security to the user, there is no personal identification (ID), cell number, or any other information that might reveal the identity of the user, just information that is set by the user preference and sales segments without compromising the user's privacy. When the user approaches the area and/or facility containing the associated infrastructure of the deployed beacons and/or tags, the application identifies the beacons and/or tags and triggers content delivery 202, such as mappings, advertisements, coupons, specials, and the like. The process provides the user with the mapping of the area and/or facility. The process determines and identifies 203 the user's profile based upon decoding the Bluetooth key name 201 and sets the sales segment and preferences 204 accordingly. The feature will provide the user with the area and/or facility mapping and/or the local content according to the user's profile and/or established preferences. The local content provides direct and targeted method of delivering local content, including advertising, coupons, special, sales, and the like. The user's location is determined by scanning the area and/or facility 102 for the known list of beacons or tags and determined by a proximity 106 to the located beacons and/or tags. Movements of the user's location around the area and/or facility are logged. The log of the movement of the user around the facility will provide a behavioral sales method, which would be added to the sales segment and preference 204. In a unique part of the method of the present invention, not only can the application provide direct content according to user's location, but the application also can direct and navigate 108 the user with directions on how to reach a place of special sales, coupons, and other places associated with the sales segment and preference 204, thus providing a complete and unique approach to indoor navigation where the user's own input of profile and preference 204 with the user behavioral sales habits can benefit both the user and the store and/or facility by providing the user with direct local content and even navigate the user to one or more desired places. The desire locations can include a store location isle where the sale special coupons take place. Again, the application and associated process operates without compromising the user's privacy.

Figure 3:
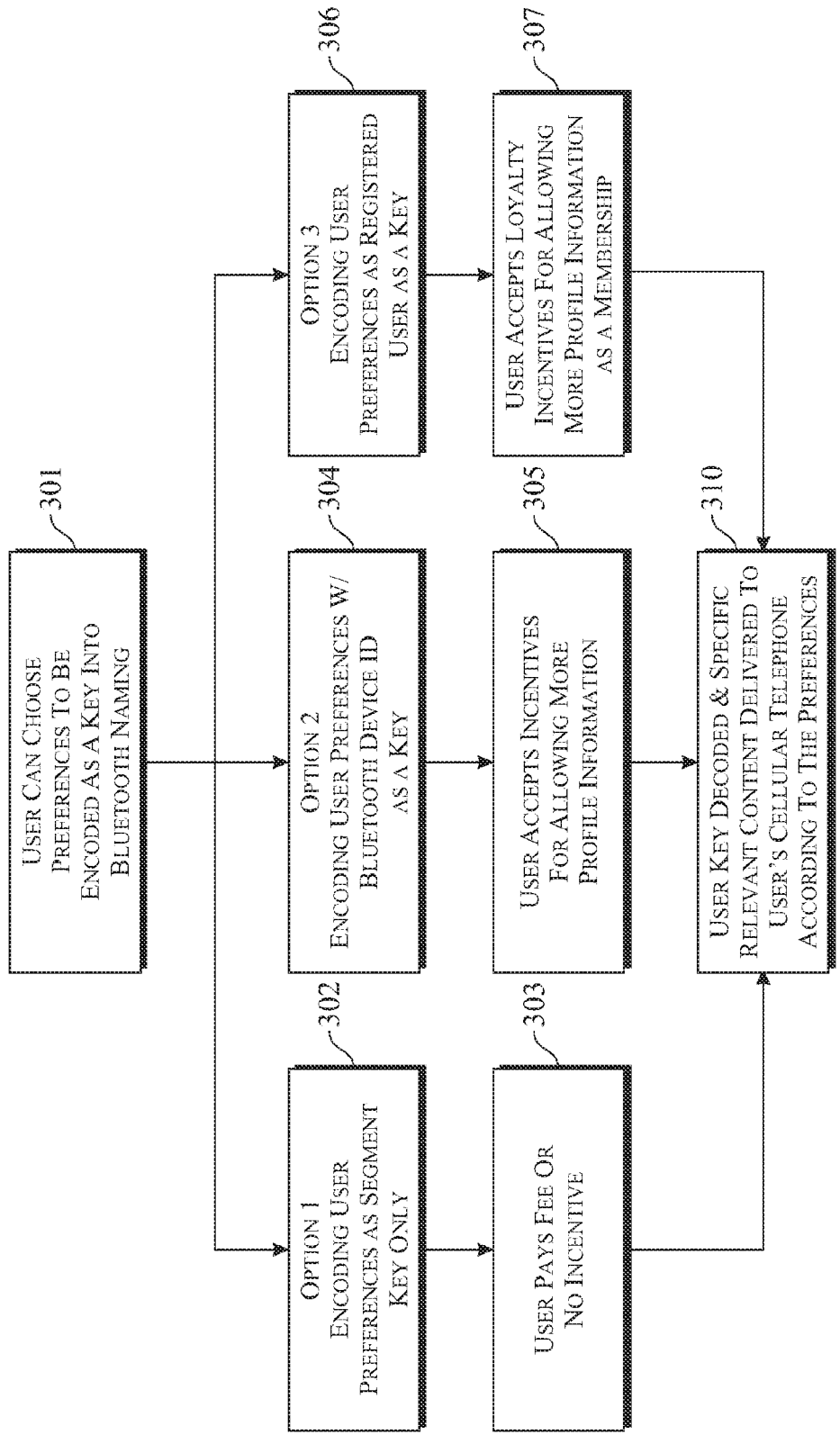
FIG. 3 presents an exemplary flow diagram describing of user profile and/or preferences feature.

A flowchart illustrating creation and use of a sales sense user preferences and/or profile options according to an embodiment of the present invention is illustrated in FIG. 3. The user can choose preference to be encoded as a key into the Bluetooth name 301. The options represent an ability of the user to become and obtain benefits of a membership, including such benefits from the facility, the store, the mall, wherein, by providing additional profile and/or preference information, the owner of at least one of the area, the facility, the store, or the mall can use the profile and/or preference information provided by the user to provide more direct and targeted contents to the user but under control of the user, and all while maintaining great attention to the user's privacy. Option 1 is part of the application where the user preference is encoded 302 as a key into the Wi-Fi and/or Bluetooth naming in a method that only the sales segment can be reveal and the user may pay a fee for the software or receive no incentive 303. In another option, option 2, the user provides preferences with part of the user Bluetooth device ID encoding as a key 304. The user accepts an incentive 305 for allowing an inclusion of additional profile information. The incentive 305 can be in form of a special sale, coupons, and the like. Again, no personal information is exposed and the user is in complete control over the information and/or the software at all times. In Option 3, the preferences of a registered users are encoded as a key 306. In this option, the user would register as a member of the store, the mall, the facility, and/or any other relation to get the full benefits of the system and to be recognized accordingly (again not personal information or any identification (ID) is exposed). For example, when the user enters the store, the mall, the facility with his carry on profile and/or preferences, the user will accept loyalty incentives for including and allowing release of the additional profile information as a membership 307. In all of the options, the user's key will be decoded when the cellular telephone or other Bluetooth enabled device is within the area and/or facility and any and all relevant content would be delivered to the user's cellular telephone or other Bluetooth enabled device according to the user's preference and/or profile 310. Again, all of this is accomplished under user control and without compromising any user privacy.

Figure 4:
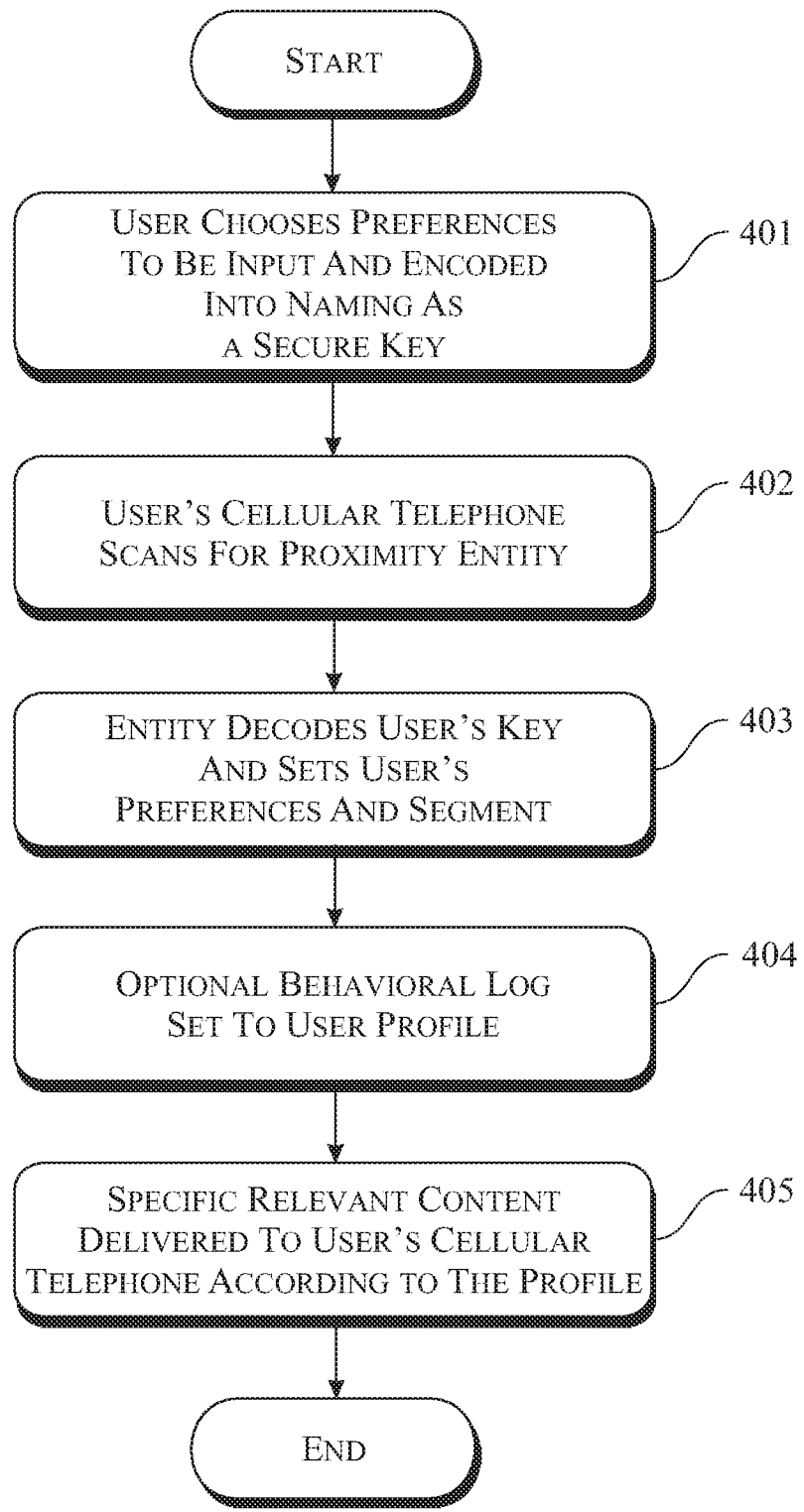
FIG. 4 presents an exemplary flow diagram describing use of a user selected preferences configuration and an optional behavioral log to deliver relevant content to the user.

A flow diagram illustrating of option secure user's preferences and/or profile according to another embodiment of the present invention is presented in FIG. 4. The user selects preferences and/or profile to be input and encode into the Bluetooth name as a secure key 401. The user's mobile telephone, employing the special navigation application, scans the proximity area 402, in the area and/or facility. The user can pre-load the map before accessing the area or upon accessing the area or the application can trigger receiving the area map. The decoding key will be processed 403 and will establish a user's preference and sales segments. An optional behavioral log 404 will be added to the decoded user key information 403 to provide the user's profile, the user's preference, and the user's behavioral information about the user all under the user control and without revealing the user's identity (ID) or affecting the user's privacy. It is analogous to bringing web sales into the reality and gives the user the ability to receive a direct local content according to his preference that will be delivered 405 to the user's cellular or mobile telephone according to the user's profile and/or preferences.

Figure 5:
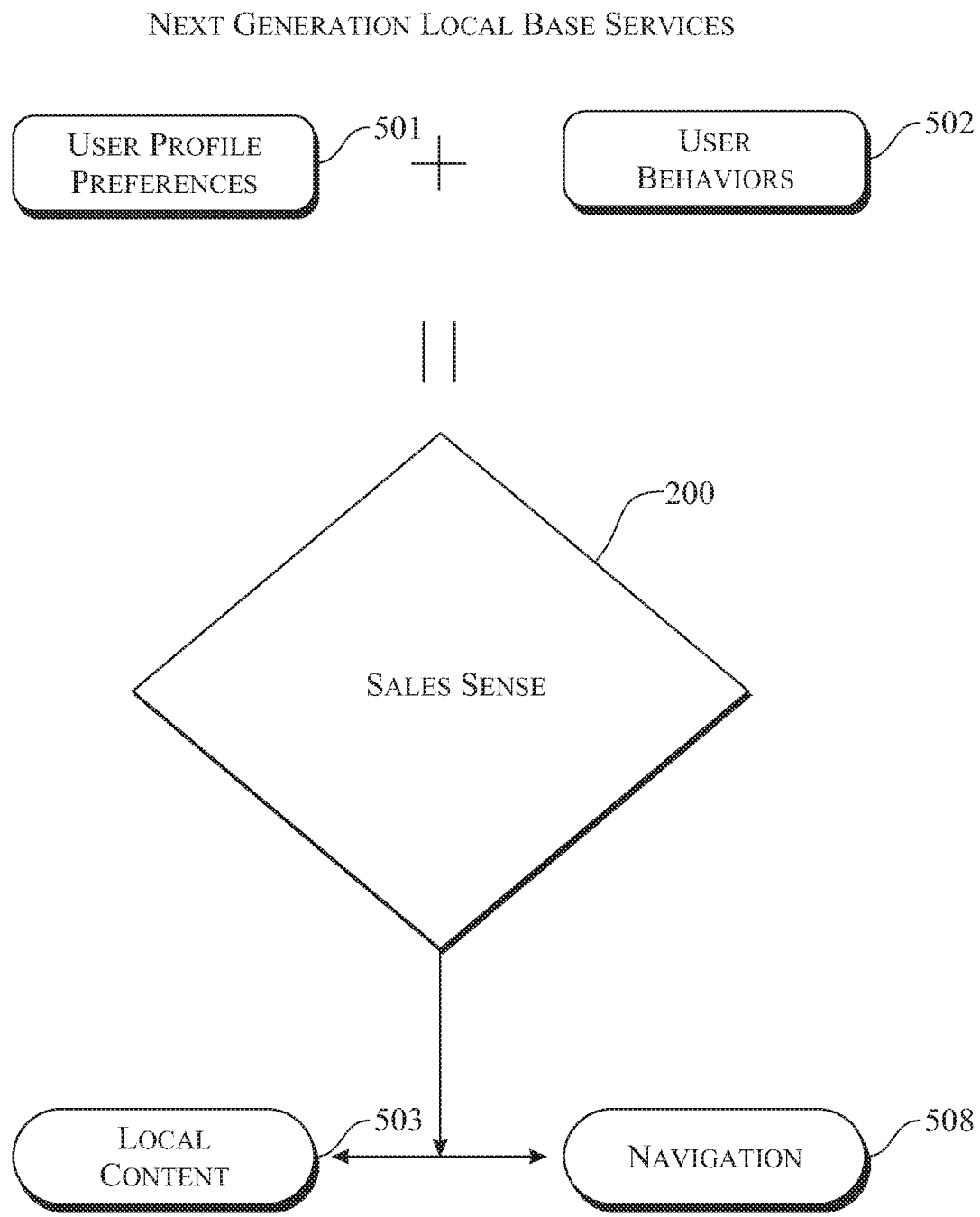
FIG. 5 presents a schematic diagram representative an exemplary next generation local base services (LBS)

A flowchart illustrating of the next generation local base services (LBS) according to another embodiment of the present invention is presented in FIG. 5. In the proposed process, the system brings together the user's input profile and/or preferences 501 and the user's behaviors 502 in the area, the facility, the store, the mall, and the like to be integrated into the proposed sales sense marketing method 200 where a direct and targeted local content 503, advertising, special sales, coupons, and the like can be used as a trigger to initiate pinpoint delivery of content to the user according to the user preference's 501 and the user's behaviors 502, as well as directing/navigating 208 the user to the desired store area isle where the sales, specials, coupons, and the like are.

Figure 6:
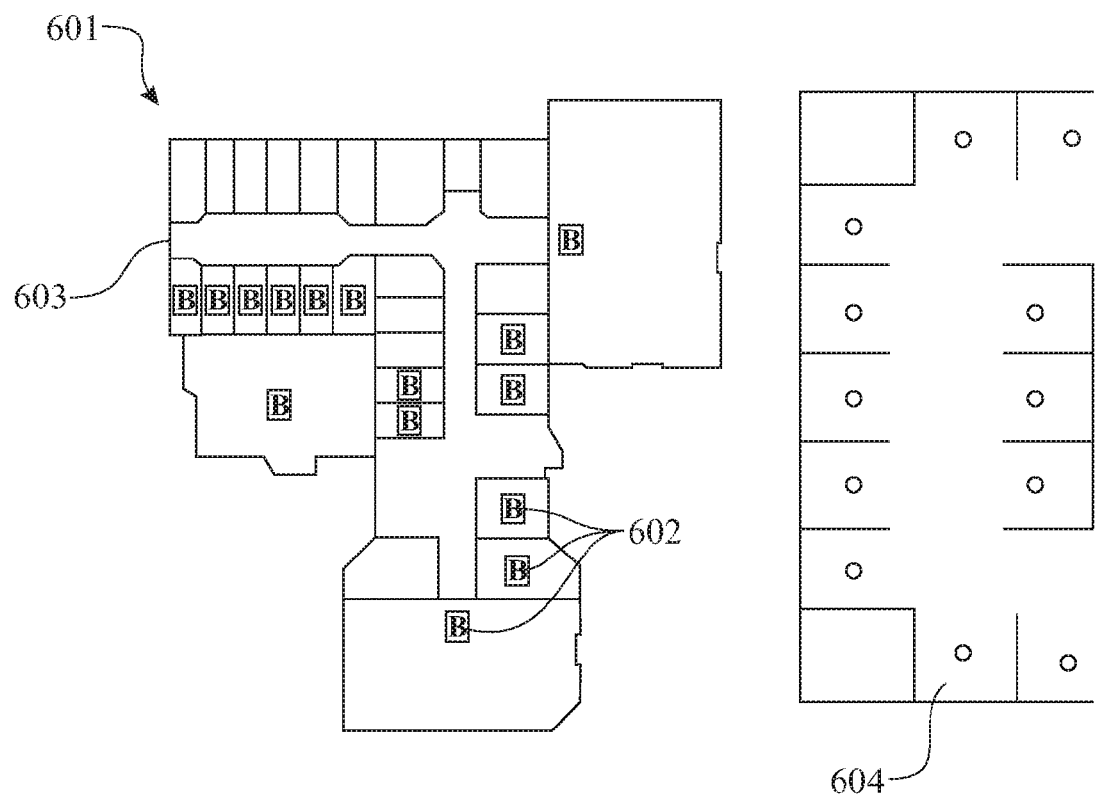
FIG. 6 present a plan view of an exemplary implementation of beacons or tags as an indoor infrastructure, wherein the exemplary illustration presents a deployment within a mall.
Figure 6:
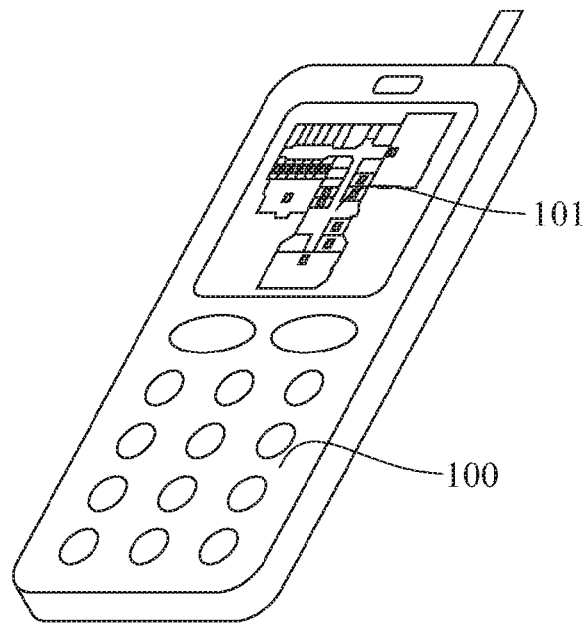

Another exemplary implementation of an infrastructure of beacons or tags in a mall application according to an embodiment of the present invention is presented in FIG. 6. Each of the Bluetooth beacons or tags contain the name of the waypoint (for example: Macy's) and the location of the beacons or tags are known and loaded into a list with a map 101 of the facility into the user mobile device 100. The list allows matching of the beacons or tags signal (names) 602 to the known list loaded with the map 101 to determine the proximity to the beacon or tag providing accuracy to less than 10 m. The beacons or tags 602 can be installed in each location designated as a way point, including a store, a rest room, a special, sales, a specific location, and the like. The user can load the map 101 at the entrance 603 from a directory stand or preload the map 101 from the Internet, any other Location based Services (LBS), or a map provider. The beacons can also be installed in a parking area 604 and, include additional sensors to determine an existence of a car parked in the parking area. The system can provide the user with navigation for parking by directing the user to empty or available parking spots.

Figure 7:
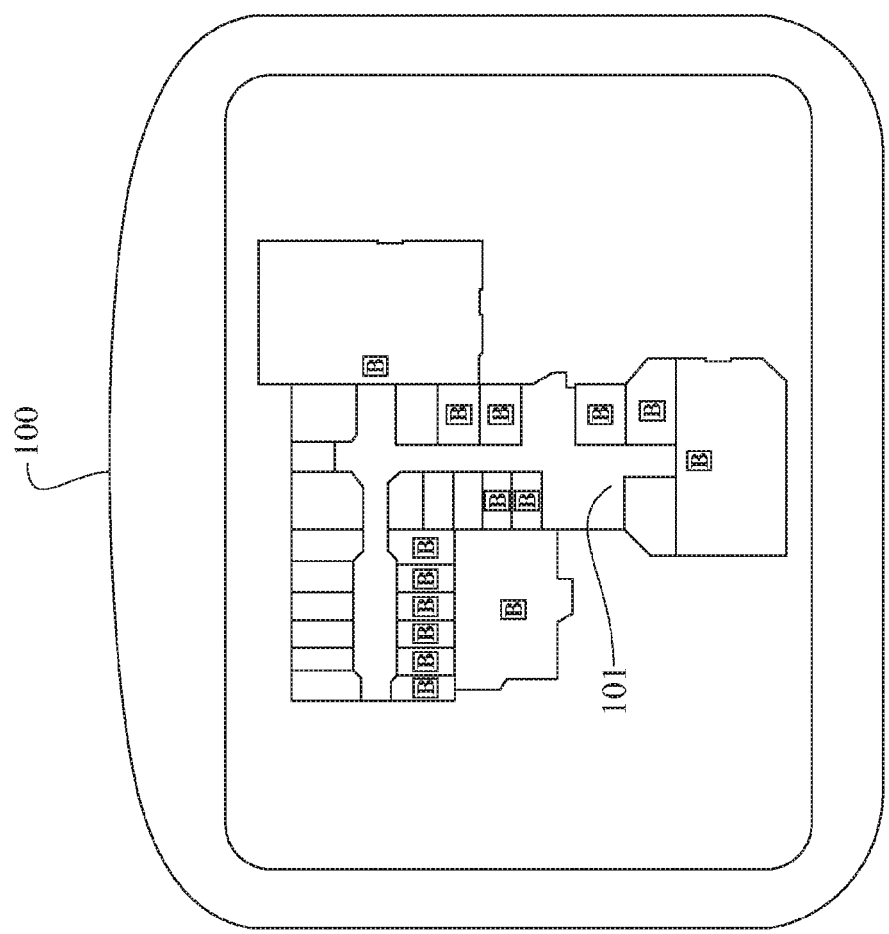
FIG. 7 presents a plan view of a display on a user's device, wherein the user's device is a mobile telephone displaying an exemplary indoor map, wherein the exemplary indoor map is one feature of a mall application.

An exemplary illustration of the user mobile telephone 100 with the indoor mapping 101 is presented in FIG. 7. The user's mobile telephone 100 will load the map 101 of the area, the facility, the building, and the like when arriving at the respective location or prior to arriving by preloading the map from an indoor mapping portal, which would be accessed over the Internet.

Figure 8:
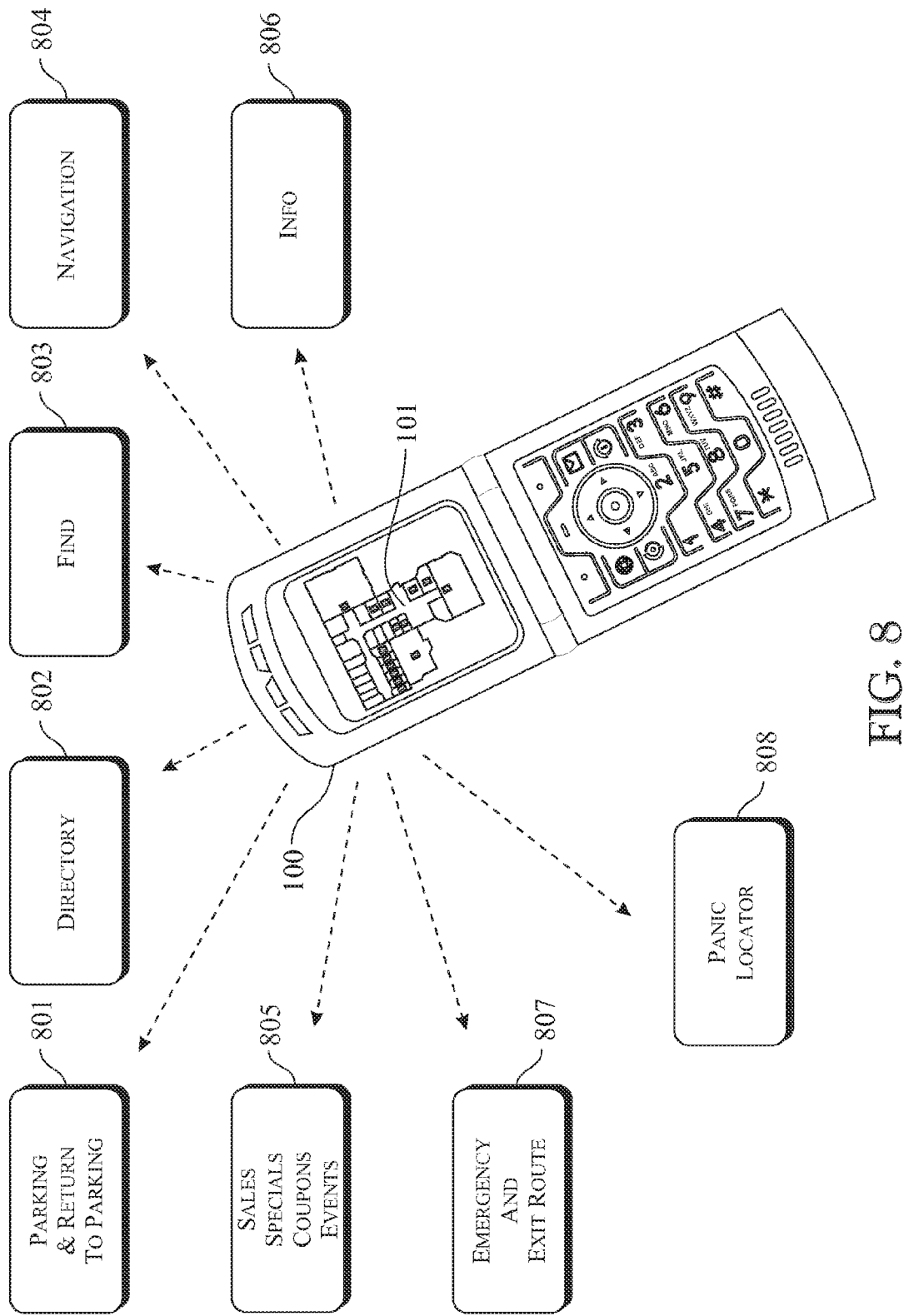
FIG. 8 presents a schematic diagram representative of exemplary features associated with an indoor mall and/or store Location Based Services (LBS) application as activated on a mobile device, wherein the Location Based Services (LBS) would be enabled by the associated infrastructure.

An indoor mall and/or store application that can be enabled by using the associated infrastructure for indoor navigation is presented as a schematic diagram in FIG. 8. The present invention provides a complete indoor application to the benefit of the user. In a way, the application is like taking the directory stand and indoor navigation to the user mobile telephone 100, starting with a parking feature 801, which can include an ability to find an available parking spot and an ability to find where the car parked (return2parking method). Another feature includes a directory 802 of the mall or store, including which isle products are located on. The application offers a find feature 803, which provides an ability to search and find items, products, locations, and the like. The application offers a navigation feature 804, which provides navigation to the user for guidance between waypoints. The application offers a content delivery feature 805, which provides information pertaining to sales, specials, coupons, and sales events, important information pertaining to the area and/or facility (such as rest room locations, key areas, playground or other kids areas), and the like. In emergency situation, the application offers an emergency and exit route navigation feature 807. The emergency and exit route navigation feature 807 provides the user with emergency information alarming and notification directly to the user's cellular or mobile telephone even if other communication methods, such as cellular communications are inoperable or unusable during the emergency situation. The user can be notified and directed to the safety exit via the included Nav4emergency method as part of the emergency and exit route navigation feature 807 of the indoor application. The application can additionally include a panic feature 808, where the user can punch or activate the secure panic button to ask to be located immediately by the authorities.

Figure 9:
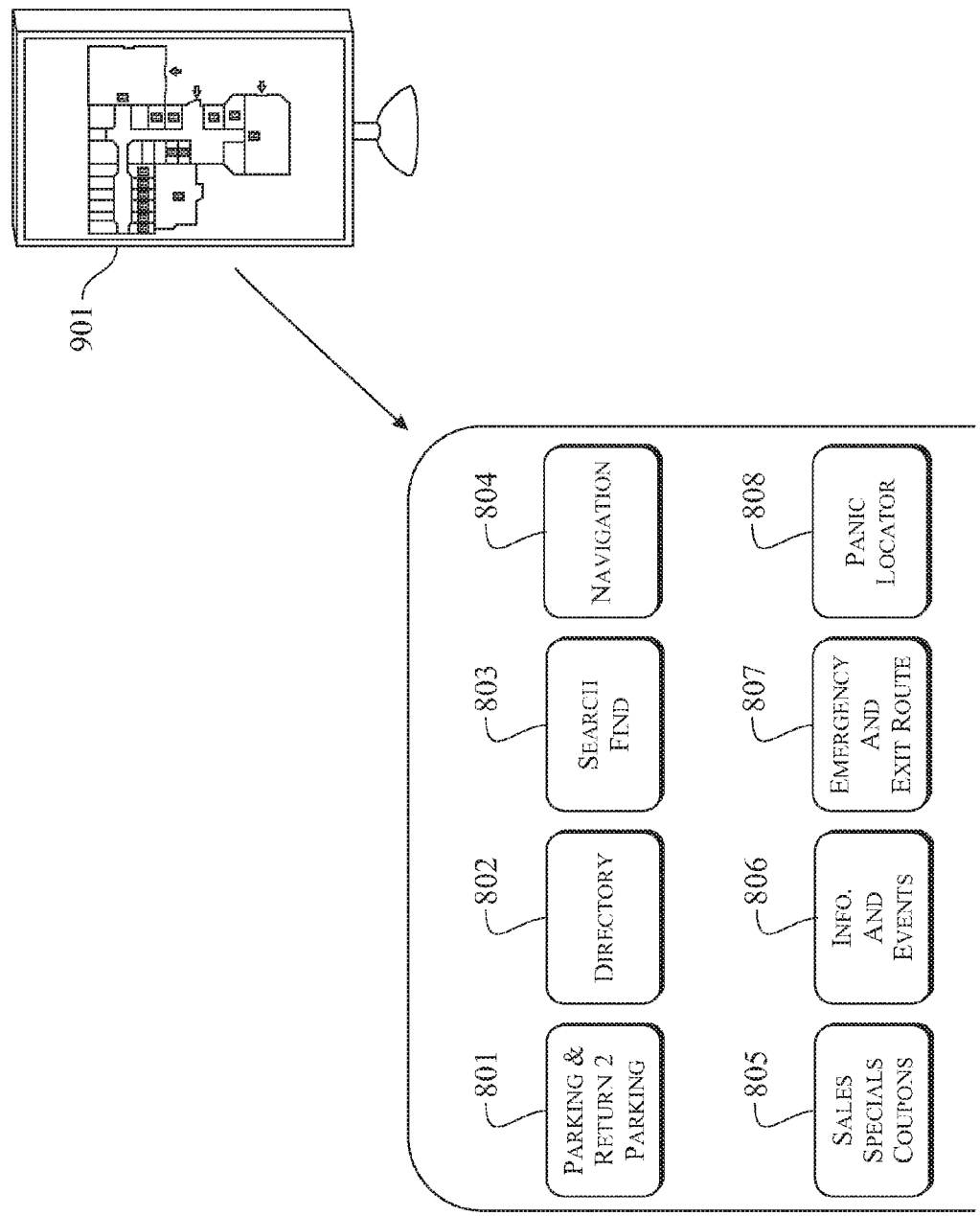
FIG. 9 presents a schematic diagram representative of exemplary features associated with the indoor mall and/or store Location Based Services (LBS) application as activated on a stationary facility directory.

The same application can be utilized through a mall or other directory 901, as shown in a schematic diagram presented in FIG. 9. The mall or other directory 901 would include the same application features as described in FIG. 8, where each feature would be activated by contacting a respective button. These include the parking feature 801; the area directory 802; the search and find feature 803; the navigation feature 804; the sales, specials, and coupons feature 805; the information feature 806, the emergency and exit route feature 807 including emergency information notification, emergency procedures, and exit routing, the panic feature 808, and any other suitable feature. Directories 901 would be deployed about the respective area, the directories containing each of these features, which would be directed towards the area, facility, mall, store and the like associated with the directory 901.

Figure 10:
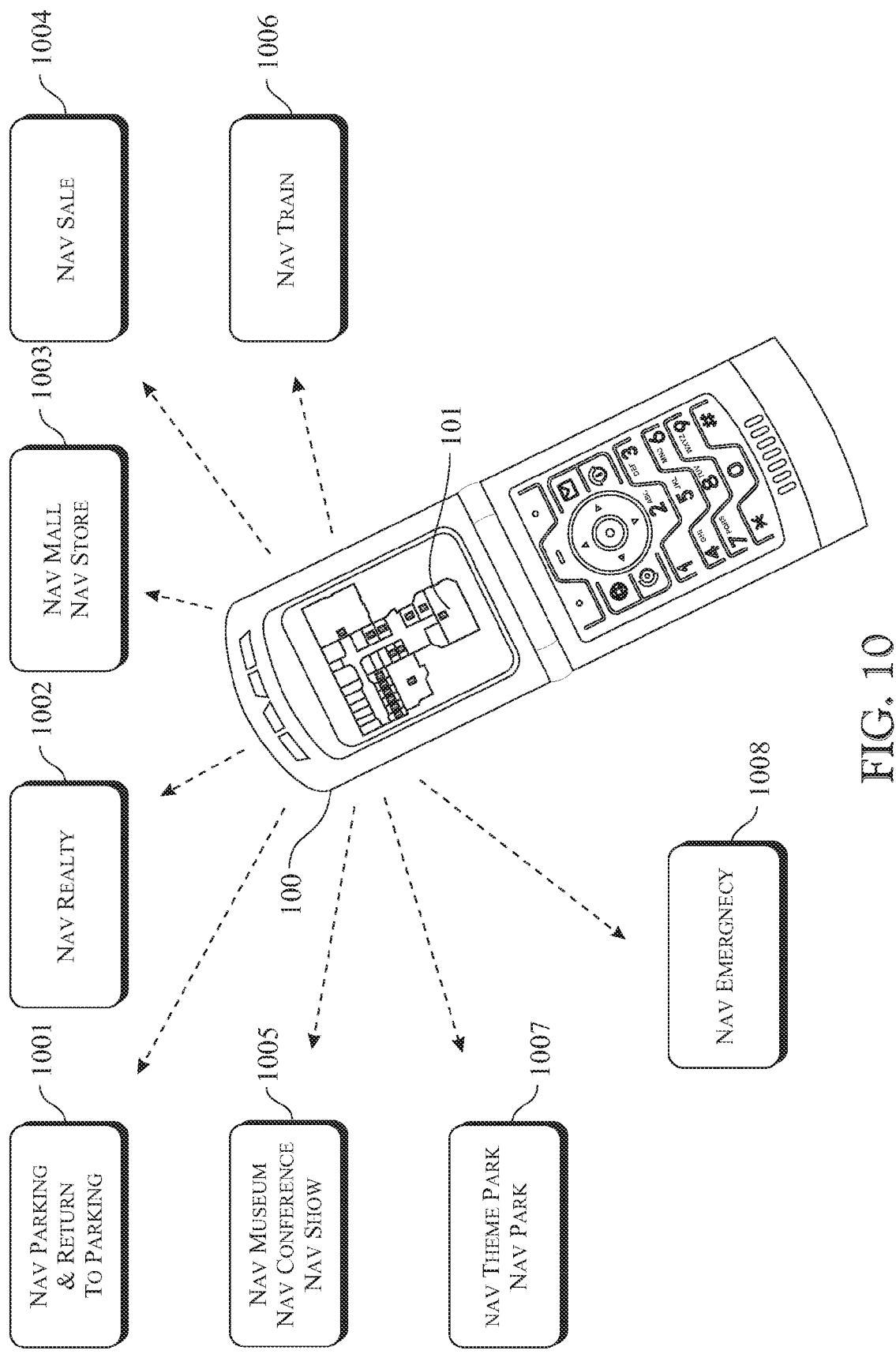
FIG. 10 presents a schematic diagram representative of exemplary features associated with various Location Based Services (LBS) applications as activated on a mobile device and enabled by the beacon and/or tag infrastructure.

The indoor or Location Based Services (LBS) application can be adapted to include any of a variety of navigation features, as illustrated in an exemplary schematic diagram presented in FIG. 10. The schematic diagram illustrates an exemplary variety of indoor applications that can be used. A first exemplary feature is referred to as Nav parking 1001, which provides parking information in a parking garage, a mall parking area, and the like to provide the user with direct navigation to an empty parking space. Additionally, the Nav parking feature 1001 can provide the user with information or navigation to the location where the user parked their car, referred to as a return 2 parking feature. A Navrealty feature 1002 provides the user with real estate content triggered by the user's exact location determined by the associated infrastructure Bluetooth beacons or tags. This can include a navrealty function 1002, providing local area real estate information directly to the user's mobile telephone or device, including navigation information if desired. A Navmall/store feature 1003 provides the same functions as previously described herein. A Navsale feature 1004 provides the user with information pertaining to special, sales, coupons, and the like. The same method can be use as a museum conference show feature 1005, where the beacons or tags are installed in known locations throughout the show conference museum. The same method can be used as an amusements parks feature 1007 for locations, such as Disney resorts, Universal Studios, and the like. Using the amusements parks feature 1007, the user can be provided with navigation in an area where GPS navigation is inaccurate and unable to provide location support. Additionally, the amusements parks feature 1007 can provide the user with navigation information, including tickets and fast pass information and locations with accuracy less than 10 m directly to the user mobile device and all without requirement of Internet bandwidth, or cellular communications or GPS. A Nav emergency feature 1008 provides the user with various information associated with an emergency condition. In an emergency condition, the Nav emergency feature 1008 provides critical information that each user might need for an emergency procedure, an emergency map, and navigation on how to go to safety from the user's current location. A Nav Train feature 1006 provides the user with information related to public or mass transit transportation. The Nav Train feature 1006 can provide information related to a subway, an underground or train mass transit, a bus transportation system, and the like. The Nav Train feature 1006 can provide information directly to the user's mobile or cellular telephone, wherein delivery of the information is triggered by the infrastructure of the beacons and/or tags installed along the route. The information provided gives the user complete navigation on a map of the train, subway, or other mass transit routes directly to the user's mobile ore cellular telephone or other suitable electronics device without need for bandwidth, the Internet or the cellular communication.

Figure 11:
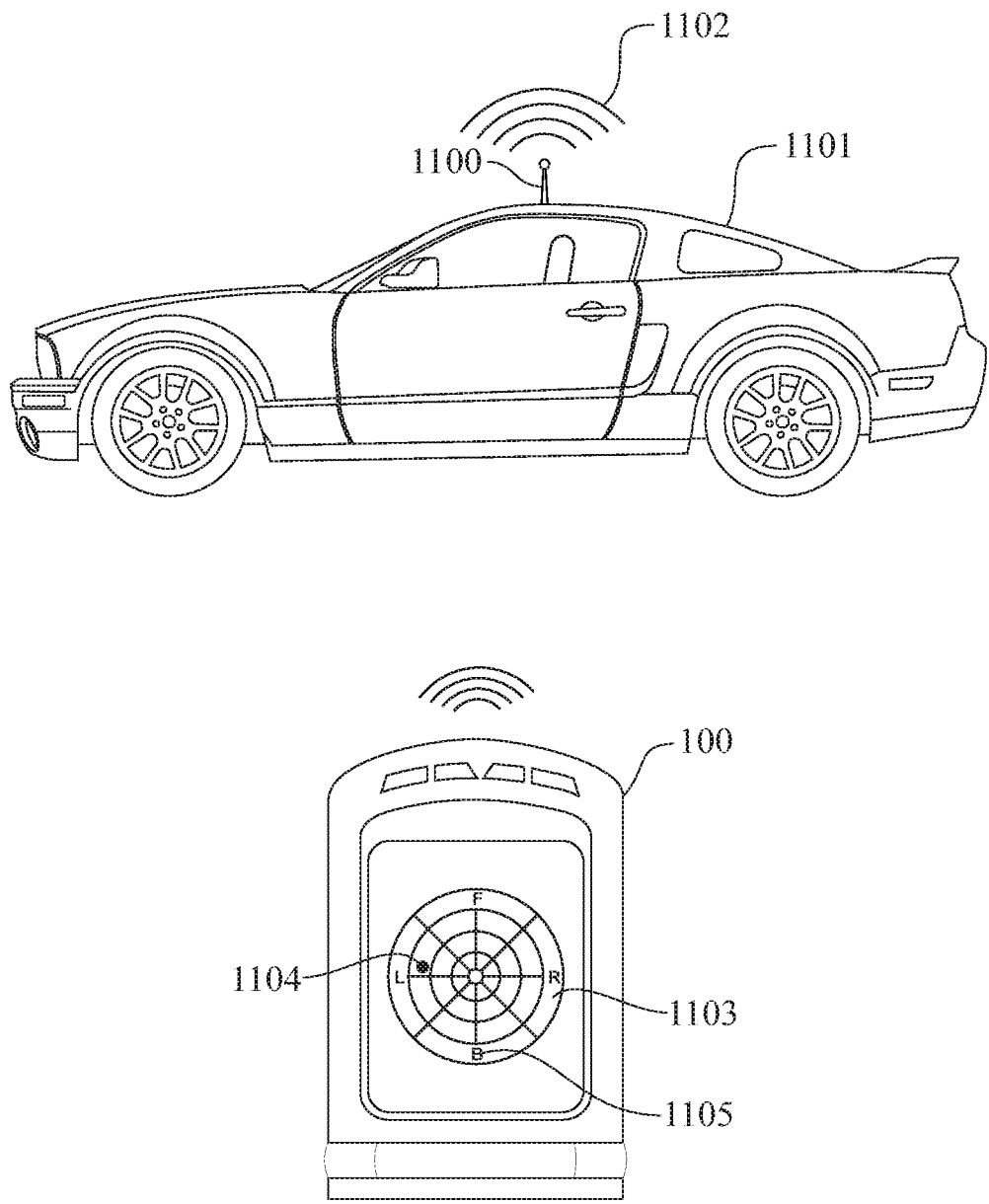
FIG. 11 presents a schematic diagram representative of a return2parking Location Based Services (LBS) application.

A return 2 parking feature is presented in a schematic diagram illustrated in FIG. 11. A long range Bluetooth beacon with set identifier (ID) having a range of over 1000 m can be install inside a car or other vehicle 1101, as a separate device 1100, or as a component of the car by the manufacturer and will broadcast 1102 the car identification (ID), which can be a Vehicle Identification Number (VIN), or a special identification (ID) set by the car owner or the car manufacture. The device 1100 can be integrated into the car to provide the signal broadcasting of the car identification (ID) or the Vehicle Identification Number (VIN). The car identification (ID) will be scanned by the return2parking application and forwarded to the user's mobile telephone 100. The scanning result can be displayed inside a series of circles 1103, where each circle 1103 represents a range to the parked car 1004. Directional indicators 1105 can be employed to present a direction to the parked car 1004. The user can find the user's parked car 1004 inside a garage or outside in another area to the accuracy of less than 10 m. The navigation provided guides the user directly to the user's parker car 1104 by presenting the navigation information on the user's mobile or cellular telephone 100. This is again accomplished without a need for any Internet bandwidth or access to the Internet use of any cellular communication.

Figure 12:
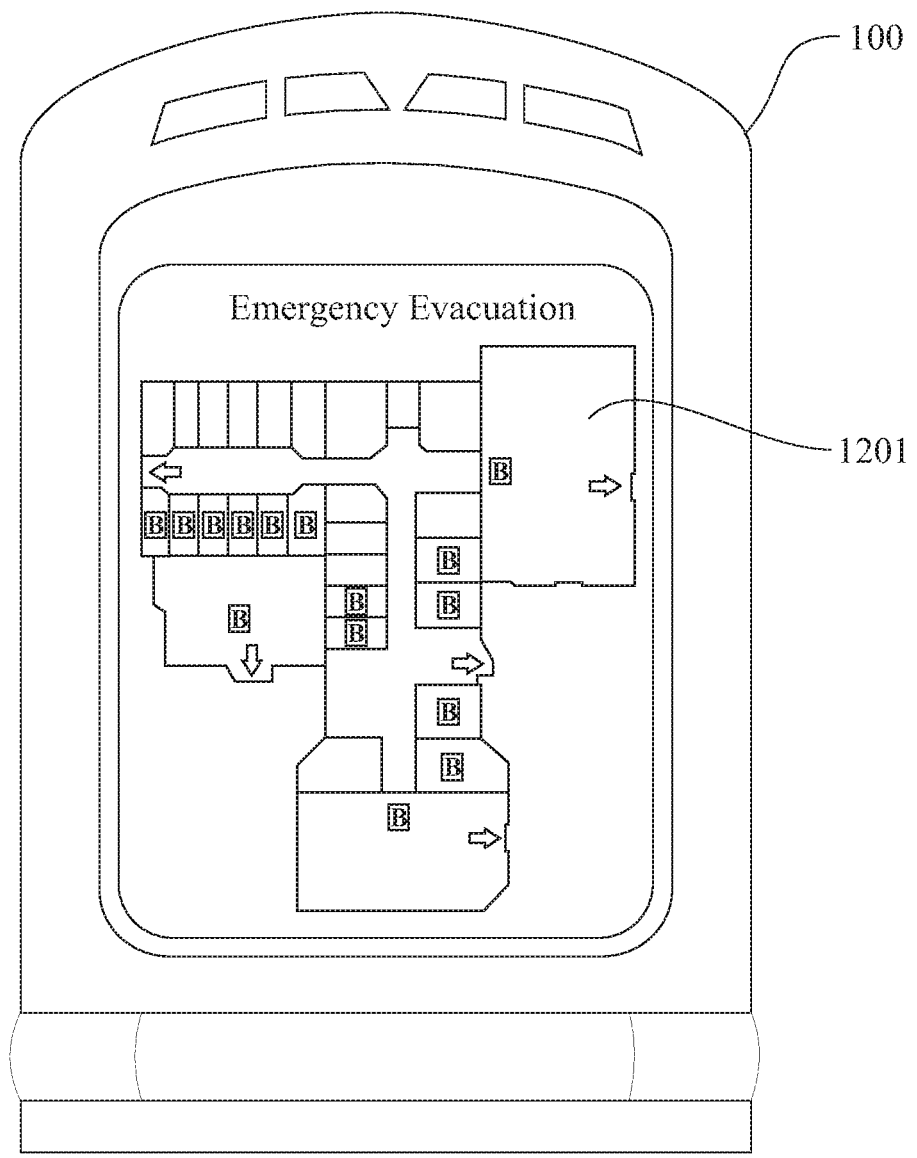
FIG. 12 presents a schematic diagram representative of a nav4emergency Location Based Services (LBS) application.

A Nav4emergency feature 1201 is represented in an illustration presented in FIG. 12. The illustrated part of the Nav4emergency feature 1201 displays an emergency map and/or an emergency procedure that is unique to each facility, building, place, mall, store, company, floor, and the like. The map can be displayed as part of the Nav4emergency feature 1201 on the user's cellular telephone 100 as part of the standard map or an emergency map and can include a procedure to show the exit and emergency route(s) in case of an emergency condition. The same program can provide alarming and notification, including important and critical information for the user anywhere. The information will be provided to the user even if during the emergency event, the cellular network or other communication method is shut down or not available, which is common during most emergency events, such as 9/11, the incident at Virginia Tech, among others. In the disclosed invention, all of the critical information from the emergency procedure to emergency maps and navigation to the exit (a safety location) are accomplished without any need for Internet bandwidth or cellular communications.

What is claimed is:

1. A method, comprising:
    defining a geofence using a network of one or more beacons, wherein each beacon is a communication device configured to provide a signal detectable by a baseband subsystem of a mobile device located within a communication range of the respective beacon, defining the geofence including:
    associating the network with a geographic region, wherein the signal from at least one beacon in the network is detectable by a mobile device located in the geographic region;
    designating an encompassment of the geographic region as the geofence; and
    associating a task with the geofence as a location based service;
    advertising the geofence, including broadcasting, by each beacon in the network, an identification signal indicating that the beacon is a component of the network;
    determining that the mobile device has entered the geofence when the mobile device is in communication with at least one beacon in the network; and
    transmitting, by a beacon in the network, information on the task and a list of unique identifiers of other beacons in the network, wherein the list is usable by the mobile device to register the unique identifiers with the baseband subsystem for the mobile device to determine whether the mobile device has entered the advertised geofence and whether or not to trigger the mobile device to perform the task,
    wherein transmitting the information is triggered by the mobile device making a contact with any beacon in the network and is conditioned upon the contact being a first contact between the mobile device and any beacon in the network, and
    wherein the method is performed by one or more processors.

2. The method of claim 1, wherein the beacon is a short range radio frequency beacon.

3. The method of claim 2, wherein the geographic region is located in an environment where signals of a global positioning system (GPS) are unavailable for location determination by the mobile device.

4. The method of claim 1, wherein the signal of each beacon includes an identifier of the corresponding beacon and a location of the corresponding beacon.

5. The method of claim 1, wherein advertising the geofence comprises advertising the location based service.

6. The method of claim 1, comprising:
    determining that the mobile device has exited the advertised geofence when the mobile device is no longer in communication with any beacon in the network; and
    causing the mobile device to transfer location monitoring to an application subsystem of the mobile device upon determining that the mobile device has exited the advertised geofence.

7. A system, comprising:
    one or more processors; and
    a non-transitory computer-readable medium storing instructions operable to cause the one or more processors to perform operations comprising:
    defining a geofence using a network of one or more beacons, wherein each beacon is a communication device configured to provide a signal detectable by a baseband subsystem of a mobile device located within a communication range of the respective beacon, defining the geofence including:
    associating the network with a geographic region, wherein the signal from at least one beacon in the network is detectable by a mobile device located in the geographic region;
    designating an encompassment of the geographic region as the geofence; and
    associating a task with the geofence as a location based service;
    advertising the geofence, including broadcasting, by each beacon in the network, an identification signal indicating that the beacon is a component of the network;
    determining that the mobile device has entered the geofence when the mobile device is in communication with at least one beacon in the network; and
    transmitting, by a beacon in the network, information on the task and a list of unique identifiers of other beacons in the network, wherein the list is usable by the mobile device to register the unique identifiers with the baseband subsystem for the mobile device to determine whether the mobile device has entered the advertised geofence and whether or not to trigger the mobile device to perform the task,
    wherein transmitting the information is triggered by the mobile device making a contact with any beacon in the network and is conditioned upon the contact being a first contact between the mobile device and any beacon in the network.

8. The system of claim 7, wherein the beacon is a short range radio frequency beacon.

9. The system of claim 8, wherein the geographic region is located in an environment where signals of a global positioning system (GPS) are unavailable for location determination by the mobile device.

10. The system of claim 7, wherein the signal of each beacon includes an identifier of the corresponding beacon and a location of the corresponding beacon.

11. The system of claim 7, wherein advertising the geofence comprises advertising the location based service.

12. The system of claim 7, the operations comprising:
    determining that the mobile device has exited the advertised geofence when the mobile device is no longer in communication with any beacon in the network; and
    causing the mobile device to transfer location monitoring to an application subsystem of the mobile device upon determining that the mobile device has exited the advertised geofence.

13. A non-transitory computer-readable medium storing instructions operable to cause one or more processors to perform operations comprising:
    defining a geofence using a network of one or more beacons, wherein each beacon is a communication device configured to provide a signal detectable by a baseband subsystem of a mobile device located within a communication range of the respective beacon, defining the geofence including:
    associating the network with a geographic region, wherein the signal from at least one beacon in the network is detectable by a mobile device located in the geographic region;
    designating an encompassment of the geographic region as the geofence; and
    associating a task with the geofence as a location based service;
    advertising the geofence, including broadcasting, by each beacon in the network, an identification signal indicating that the beacon is a component of the network;
    determining that the mobile device has entered the geofence when the mobile device is in communication with at least one beacon in the network; and
    transmitting, by a beacon in the network, information on the task and a list of unique identifiers of other beacons in the network, wherein the list is usable by the mobile device to register the unique identifiers with the baseband subsystem for the mobile device to determine whether the mobile device has entered the advertised geofence and whether or not to trigger the mobile device to perform the task,
    wherein transmitting the information is triggered by the mobile device making a contact with any beacon in the network and is conditioned upon the contact being a first contact between the mobile device and any beacon in the network.

14. The non-transitory computer-readable medium of claim 13, wherein the beacon is a short range radio frequency beacon.

15. The non-transitory computer-readable medium of claim 14, wherein the geographic region is located in an environment where signals of a global positioning system (GPS) are unavailable for location determination by the mobile device.

16. The non-transitory computer-readable medium of claim 13, wherein the signal of each beacon includes an identifier of the corresponding beacon and a location of the corresponding beacon.

17. The non-transitory computer-readable medium of claim 13, wherein advertising the geofence comprises advertising the location based service.

18. The non-transitory computer-readable medium of claim 13, the operations comprising:
    determining that the mobile device has exited the advertised geofence when the mobile device is no longer in communication with any beacon in the network; and
    causing the mobile device to transfer location monitoring to an application subsystem of the mobile device upon determining that the mobile device has exited the advertised geofence.

* * * * *